(12) United States Patent
Montminy et al.

(10) Patent No.: US 7,404,884 B2
(45) Date of Patent: Jul. 29, 2008

(54) INJECTION BONDED ARTICLES AND METHODS

(75) Inventors: Emile O. Montminy, Lowell, MA (US); Li-Shiang Liang, Harvard, MA (US)

(73) Assignee: Siemens Water Technologies Holding Corp., Warrendale, PA (US)

( * ) Notice: Subject to any disclaimer, the term of this patent is extended or adjusted under 35 U.S.C. 154(b) by 553 days.

(21) Appl. No.: 10/423,245

(22) Filed: Apr. 25, 2003

(65) Prior Publication Data

US 2004/0211668 A1    Oct. 28, 2004

(51) Int. Cl.
B01D 61/48    (2006.01)

(52) U.S. Cl. .................. 204/632; 204/635; 204/637; 204/639

(58) Field of Classification Search .............. 204/632, 204/635, 637, 639
See application file for complete search history.

(56) References Cited

U.S. PATENT DOCUMENTS

| | | | |
|---|---|---|---|
| 3,030,435 A | 4/1962 | Andrews | |
| 3,223,612 A | 12/1965 | Chen et al. | |
| 3,398,222 A | 8/1968 | Kaufman, Jr. et al. | |
| 3,866,926 A | 2/1975 | Traum | |
| 3,873,656 A | 3/1975 | Garner | |
| 3,901,964 A | 8/1975 | Rubright | |
| 4,102,752 A | 7/1978 | Rugh, II | |
| 4,545,585 A | 10/1985 | Buse | |
| 4,569,747 A | 2/1986 | Kedem et al. | |
| 4,632,745 A | 12/1986 | Giuffrida et al. | |
| 4,747,929 A | 5/1988 | Siu et al. | |
| 4,751,153 A | 6/1988 | Roth | |
| 4,770,756 A | 9/1988 | Crawlfield et al. | |
| 4,784,741 A | 11/1988 | Boulton et al. | |
| 4,808,287 A | 2/1989 | Hark | |
| 4,832,804 A | 5/1989 | Brattan | |
| 4,839,122 A | 6/1989 | Weaver | |
| 4,872,888 A | 10/1989 | Ehrfeld et al. | |
| 4,892,632 A | 1/1990 | Morris | |
| 4,894,128 A | 1/1990 | Beaver | |

(Continued)

FOREIGN PATENT DOCUMENTS

DE    40 03 812 A1    8/1990

(Continued)

OTHER PUBLICATIONS

Matthew Defosse, "The name of this game is bond—good bond," *Modern Plastics*, Apr. 2005, pp. 54-59.

(Continued)

*Primary Examiner*—Arun S Phasge

(57) ABSTRACT

Injection bonded articles comprised of a rigid core and secured together with an elastomeric material network which also forms seals and encapsulates at least a portion of the rigid core. The elastomeric material is selected to be compatible with the material comprising the rigid core to create a chemical and mechanical bond therebetween. Injection bonding and over-molding techniques are used to fabricate an electrodeionization apparatus spacer comprised of mated rigid segments secured by a unitary elastomeric material network that also forms internal and external seals that fluidly isolate one or more of inlet ports, resin cavities, and outlet ports as well as throughports. Injection bonding and over-molding techniques can also be used to fabricate other articles comprised of multiple segments.

22 Claims, 18 Drawing Sheets

U.S. PATENT DOCUMENTS

| | | | |
|---|---|---|---|
| 4,898,653 | A | 2/1990 | Morris |
| 4,902,420 | A | 2/1990 | Pall et al. |
| 4,915,803 | A | 4/1990 | Morris |
| 4,940,518 | A | 7/1990 | Morris |
| 4,970,103 | A | 11/1990 | Wolf et al. |
| 4,999,107 | A | 3/1991 | Guerif |
| 5,066,375 | A | 11/1991 | Parsi et al. |
| 5,076,924 | A | 12/1991 | Persson et al. |
| 5,185,048 | A | 2/1993 | Guerif |
| 5,234,652 | A | 8/1993 | Woodhams et al. |
| 5,236,205 | A | 8/1993 | Chen et al. |
| 5,267,740 | A | 12/1993 | Stritzke |
| 5,284,718 | A | 2/1994 | Chow et al. |
| 5,295,698 | A | 3/1994 | Agarwal et al. |
| 5,464,700 | A | 11/1995 | Steck et al. |
| 5,551,706 | A | 9/1996 | Barna et al. |
| 5,681,048 | A | 10/1997 | Tronel |
| 5,681,438 | A | 10/1997 | Proulx |
| 5,700,017 | A | 12/1997 | Tensor |
| 5,804,762 | A | 9/1998 | Jones et al. |
| 5,824,217 | A | 10/1998 | Pearl et al. |
| 5,891,328 | A | 4/1999 | Goldstein |
| 5,902,956 | A | 5/1999 | Spies et al. |
| 6,123,823 | A * | 9/2000 | Mani .......................... 204/632 |
| 6,126,805 | A | 10/2000 | Batchelder et al. |
| 6,235,166 | B1 | 5/2001 | Towe et al. |
| 6,319,449 | B1 | 11/2001 | Campbell et al. |
| 6,402,920 | B1 | 6/2002 | Sato et al. |
| 6,464,920 | B1 | 10/2002 | Krämer |
| 6,758,954 | B2 | 7/2004 | Liang et al. |
| 2002/0144954 | A1 * | 10/2002 | Arba et al. .................. 210/742 |
| 2006/0060532 | A1 | 3/2006 | David |

FOREIGN PATENT DOCUMENTS

| | | |
|---|---|---|
| EP | 00797529 B1 | 10/1997 |
| JP | 61058159 A | 3/1986 |
| JP | 2002001070 | 1/2002 |
| WO | WO 96/18550 | 6/1996 |

OTHER PUBLICATIONS

Diedrich, K.M., "Bonding Rubber to Plastics Without Adhesives—Benefits for Producer and Consumer," 161st ACS Rubber Division Meeting (Conference Paper Abstract), Spring 2002.

Japanese Application No. 02027148 (English Abstract), Feb. 8, 1990.

Mehta, M. et al., "Bonding of Thermoplastic Elastomers to Plastics During Multi-Component Injection Molding Process," 158th ACS Rubber Division Meeting (Conference Paper Abstract), Fall 2000.

Merida, W.R. et al., "Novel PEM Fuel Cell Design With Non-Planar Membrane-Electrode Assemblies," Institute for Integrated Energy Systems, University of Victoria, Victoria, B.C., Canada, V8W 3P6, no date.

"Plastic and Metal Joined Together," Design News, May 5, 2003.

Zoellner, O.J. et al., "Plastic/Metal Hybrid—A New Development in Injection Molding Technology," Bayer Corporation, Copyright 2002.

* cited by examiner

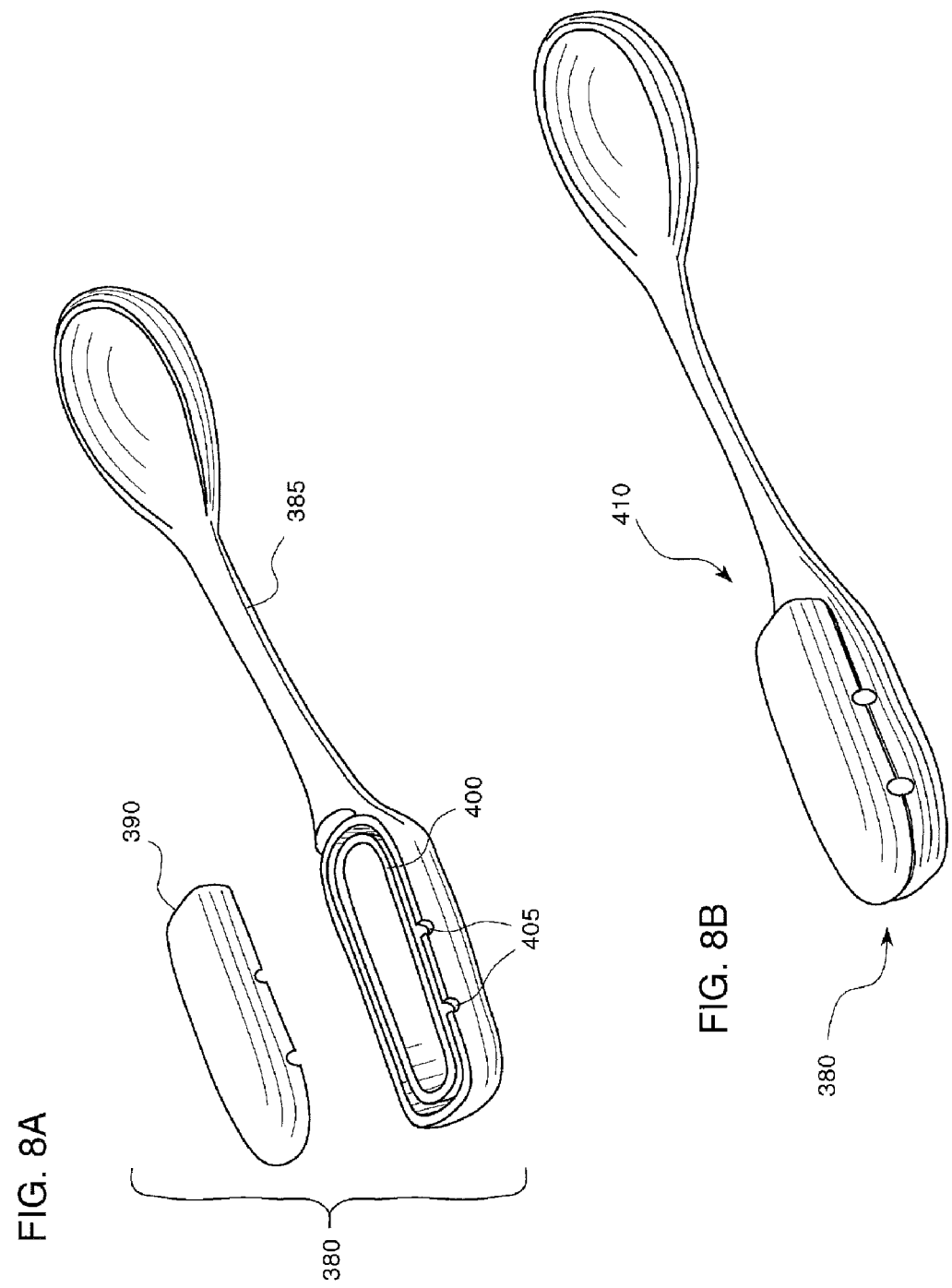

US 7,404,884 B2

INJECTION BONDED ARTICLES AND METHODS

BACKGROUND OF THE INVENTION

1. Field of the Invention

The invention relates to injection bonded components and methods thereof and, more particularly to electrically driven purification apparatus comprising injection bonded components.

2. Discussion of Related Art

The fabrication of articles having a rigid part and an elastomeric part has been described. For example, Kaufman, Jr. et al., in U.S. Pat. No. 3,398,222, describe a method of making wheel comprised of a plastic material and a rubber material by molding a continuous rubber body to a rigid plastic body. Smith, in European Patent Application Publication 0 600 187, describes a composite for in-mould transfer printing and the decoration of plastic or rubber articles as well as a process for their use. Gee et al., in International Publication Number WO 96/18550, describe bonding a cured elastomer to a component made of plastic and metal by ionizing a surface of the elastomer and ionizing a surface of the plastic and then compressing the ionized surfaces together while applying pressure and heat.

Tensor, in U.S. Pat. No. 5,700,017, describes a flanged rubber combustion seal. An elastomeric combustion seal for a cylinder head gasket of an internal combustion engine includes a radially inner sealing section and a radially outer section. A first integral cantilevered section is disposed between the inner sealing section while a second integral cantilevered section extends radially outwardly from the outer section and is bonded to an inner peripheral edge of a base plate. The seal has grooves with roots.

The purification and/or treatment of liquids has been described. For example, McMahon, in U.S. Pat. No. 5,166,220, describes a water softening process wherein a brine solution is used for the regeneration of ion exchange resin. Other systems that can be used to purify or demineralize water have also been described. For example, Gaysowski, in U.S. Pat. No. 3,407,864, describes an apparatus that involves both ion exchange and electrodialysis. Johnson, in U.S. Pat. No. 3,755,135, describes a demineralizing apparatus using a DC potential. Also, Brattan, in U.S. Pat. No. 4,832,804, describes an electrolytic cell that has electrodes, an inlet channel, and an outlet channel.

Electrodeionization devices can also be used to purify water as described by, for example, Giuffrida et al. in U.S. Pat. Nos. 4,632,745, 4,925,541 and 5,211,823, by Ganzi in U.S. Pat. Nos. 5,259,936 and 5,316,637, by Parsi et al. in U.S. Pat. No. 5,066,375, by Oren et al. in U.S. Pat. No. 5,154,809 and by Kedem in U.S. Pat. No. 5,240,579.

Components, and methods thereof, of such electrically driven apparatus have also been described. For example, Guerif, in U.S. Pat. No. 4,999,107, describes a separator frame for a two-fluid exchanger device and a seal plane obtained by assembling four thermoplastic sheets about a screen, wherein the outermost sheets is flexible, and hollowed-out in zones corresponding to diffusers. Guerif, in U.S. Pat. No. 5,185,048, describes manufacturing a separator frame for a stack in an exchanger device. The separator is made by assembling two thermoplastic films having the shape of a seal plane and sandwiched over two different types of thermoplastic expanded structures. Goldstein, in U.S. Pat. No. 5,891,328, describes a membrane-frame for processes including electrodialysis. The integral, monolithic frame-membrane has a semi-permeable membrane portion and a frame portion. Sato et al., in U.S. Pat. No. 6,402,920, describe a concentrating compartment and spacer construction for an electrodeionization apparatus. The spacer is composed of a mesh and a frame-shaped gasket superposed on the periphery of the mesh. Further, Agarwal et al., in U.S. Pat. No. 5,295,698, describe a molded plastic gasket that has a main body and an integrally formed sealing bead surrounding a service opening. The sealing bead is vertically moveable relative to the gasket body.

Steck et al., in U.S. Pat. No. 5,464,700, describe a gasketed membrane electrode assembly for electromechanical fuel cells. The gasketed membrane electrode assembly uses gasketing material at the periphery of an ion exchange membrane. Mérida, W. R. et al., in "Novel PEM Fuel Cell Design with Non-Planar Membrane-Electrode Assemblies,"10$^{th}$ Canadian Hydrogen Conference, pp. 745-753, Quebec, 2000, describe a proton exchange membrane fuel cell design based on a non-planar electrode-membrane assembly and non-conventional collector plates.

BRIEF SUMMARY OF THE INVENTION

The present invention is directed to injection bonded components and methods thereof and, in one or more embodiments, to electrodeionization apparatus having injection bonded components and methods of manufacturing and uses thereof.

In accordance with one or more embodiments, the present invention provides an electrodeionization apparatus spacer comprising a rigid core and an elastomeric material network within the rigid core and forming a seal on at least a portion of a surface of the rigid core. In some embodiments, the electrodeionization apparatus spacer further comprises a resin cavity in fluid communication with an inlet port and with an outlet port, wherein the inlet port, the outlet port, and the resin cavity are defined in the rigid core.

In other embodiments, the present invention provides an electrodeionization apparatus spacer comprising a rigid core and a unitary elastomeric material wherein a portion of the elastomeric material forms a seal disposed within the rigid core and wherein a portion of the elastomeric material encapsulates at least a portion of an outer surface of the rigid core. In some embodiments, the electrodeionization apparatus spacer further comprises an internal outlet seal comprised of the elastomeric material and disposed within the rigid core and/or an internal inlet seal comprised of the elastomeric material and disposed within the rigid core.

In other embodiments, the present invention provides an electrodeionization apparatus spacer comprising a rigid core comprising an inlet port connected to a resin cavity through an inlet conduit and an outlet port connected to the resin cavity through an outlet conduit. The electrodeionization apparatus spacer further comprises a unitary resilient material forming an inlet port seal around the inlet port, a resin cavity seal around the resin cavity, an outlet port seal around the outlet port, an inlet conduit seal around the inlet conduit, an outlet conduit seal around the outlet conduit and an outer seal disposed around a periphery of the rigid core. In some embodiments, the rigid core and the unitary resilient material is comprised of a thermoplastic material.

In other embodiments, the present invention provides an electrodeionization apparatus comprising a concentrating compartment defined by a concentrating compartment spacer and a depleting compartment disposed adjacent the concentrating compartment. In some embodiments, the depleting compartment is defined by a depleting compartment spacer comprised of a rigid core and an elastomeric material network disposed within the rigid core.

In other embodiments, the present invention provides a method of fabricating an electrodeionization apparatus spacer comprising a step of providing a first segment and a second segment. In some embodiments, the first and second segments have complementary features that allow mating assembly in a predetermined arrangement. The method further comprises a step of mating the first and second segments to form a rigid core comprising a channel traversing at least a portion of an interface between the first and second segments and a resin cavity in communication with an inlet port and an outlet port. The method can further comprise a step of injecting an elastomeric material into the channel to form an elastomeric network between the first and second segments. In some embodiments, the method further comprises a step of forming an internal inlet seal with the elastomeric material at the interface and around an inlet manifold that fluidly connects the inlet port to the resin cavity and/or a step of forming an internal outlet seal with the elastomeric material at the interface and around an outlet manifold that fluidly connects the resin cavity to the outlet port. In yet other embodiments, the first and second segments and the elastomeric material are comprised of a thermoplastic polymer.

In other embodiments, the present invention provides a method of fabricating an electrodeionization apparatus spacer comprising a step of mating a first complementary rigid segment to a second complementary rigid segment to form a rigid core that comprises or defines a resin cavity in communication with an inlet port and an outlet port. In some embodiments, the method further comprises a step of binding the first and second complementary segments with an elastomeric material. In yet other embodiments, the method further comprises a step of forming a seal with the elastomeric material on an outer surface of the mated first and second complementary segments.

In other embodiments, the present invention provides a method of assembling an, electrodeionization apparatus comprising a step of positioning a depleting compartment spacer into an electrodeionization apparatus assembly. In some embodiments, the depleting compartment spacer comprises a rigid core and an elastomeric material seal disposed within the rigid core.

In other embodiments, the present invention provides a method of purifying water comprising a step of introducing water to be purified into an electrodeionization apparatus comprising a concentrating compartment defined by a concentrating compartment spacer and a depleting compartment disposed adjacent the concentrating compartment and defined by a depleting compartment spacer that comprises a rigid core and an elastomeric material network disposed within the rigid core. The method further comprises a step of applying an electrical potential across the electrodeionization apparatus to promote migration of undesirable species in the water from the depleting compartment into the concentrating compartment.

In other embodiments, the present invention provides a filter cartridge comprising a filter element supported between mating segments and a unitary elastomeric material network within the mated rigid segments forming a seal disposed around at least a portion of a periphery of the mating segments. In some embodiments, the filter cartridge further comprises a sheath comprised of the unitary elastomeric material encapsulating at least a portion of an outer periphery of the mating segments.

BRIEF DESCRIPTION OF THE SEVERAL VIEWS OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. Preferred non-limiting embodiments of the present invention will be described by way of example with reference to the accompanying drawings, in which:

FIGS. 8A-8D are schematic illustrations of an injection bonded kitchen article according to one or more embodiments of the present invention;

FIGS. 11A-11D are schematic illustrations of injection bonded articles according to one or more embodiments of the present invention, wherein FIG. 11A is an exploded view of a disposable camera having a rigid component comprised of an elastomeric material and mating segments, FIG. 11B is a perspective view of the fabricated disposable camera shown in FIG. 11A, FIG. 11C is a perspective view of a sealed or sheathed electronic device, and FIG. 11D is a perspective view of a sealed or sheathed rechargeable flashlight;

DETAILED DESCRIPTION OF THE INVENTION

Figure 1:
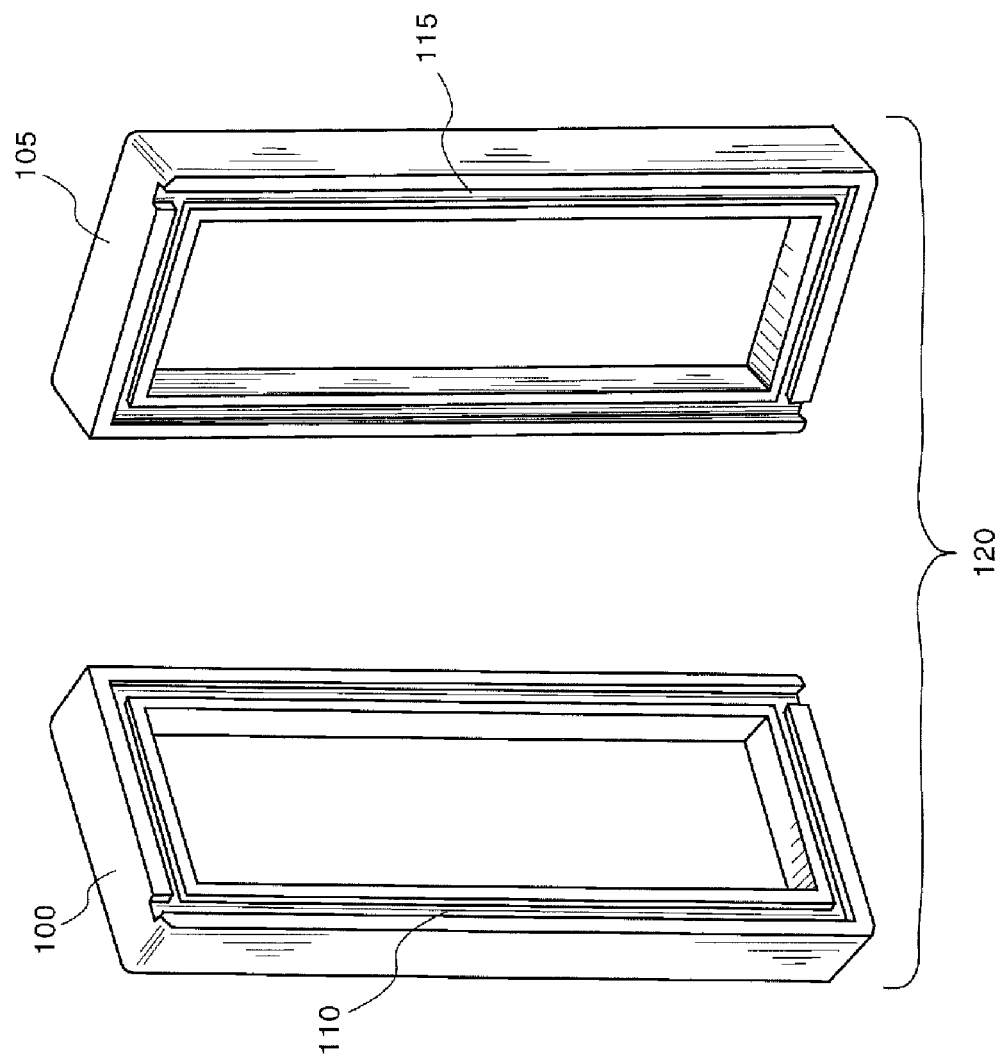
FIG. 1 is a perspective view of an article having two mating segments according to one or more embodiments of the present invention.

The present invention provides injection bonded articles and methods of fabricating and uses thereof. The injection bonded articles can comprise a plurality of rigid segments, which can be mated in a predetermined and/or complementary arrangement. In some embodiments, the articles typically comprise a plurality of segments bonded or secured together with a material disposed at an interface between adjoining or adjacent segments. In other embodiments, the injected material can further form an encapsulating sheath over at least a portion of a surface of the rigid segments. Notably, the injected material can be used in conjunction with over-molding techniques to form features or structures on an outer and/or inner surface of the rigid segments. The articles can further comprise internal features, such as but not limited to, conduits or channels, without the use of cutting, drilling, or other techniques requiring material loss or removal such as the lost-wax or investment casting technique. Other internal features or structures such as internal seals can also be present. In other embodiments, the articles comprise complementarily mating rigid segments having features, such as indentations and protrusions that permit assembly in a predetermined arrangement. The mated rigid segments typically define or have channels, passageways, or pathways wherein a flowable material can be induced to move therethrough during fabrication of the injection bonded articles. Also during fabrication, the flowable material can be induced on a surface, such as an outer, exposed surface, of the mated rigid segments. The flowable material, at least partially filling the channels defined in the mated rigid segments can be induced to undergo a change, such as a phase change by, for example, cooling, chemical reaction, or both to form a network disposed within the rigid component and, in some cases, at least partially on the surface of the mated rigid segments forming the rigid component. In some embodiments, the material filling the channels can further form structures disposed internally in the rigid component. In yet other embodiments, the flowable material can form a network of such material disposed within the rigid component and, in still other embodiments, on at least a portion of the outer surface of the rigid component. Further embodiments contemplated within the scope of the present invention include a rigid component comprises segments having a network of material disposed therein as well as on a surface thereof that define features, externally, internally, or both, such that the material forms a unitary element.

In still other embodiments, the present invention provides methods of fabricating a rigid plastic component having an elastomeric material network disposed therein and partially encapsulating at least a portion of an outer surface of the rigid plastic component. The rigid component can comprise a plurality of segments, i.e. two or three or more segments; and in some embodiments, the rigid component can comprise a plurality of mated rigid segments defining a core; and in yet other embodiments, the rigid component can comprise a plurality of rigid segments having features that permit their complementary mating in a predetermined arrangement. The present invention can also provide an article comprising a rigid component, such as a rigid core, comprising two, three or more mated rigid plastic material segments and a network comprised of an elastomeric material disposed between and securing together the mated plastic material segments. The article can further comprise a sheathing comprised of the elastomeric material disposed on at least a portion of an outer surface of the rigid core. In some embodiments, the rigid plastic material and the elastomeric material are comprised of a thermoplastic polymer.

Various techniques can be used to introduce the material and promote filling and flow through the channels and further into adjacent structures. For example, the material can be introduced by transfer molding, wherein pressure is used to introduce the material while closing an appropriate mold in which the rigid segments are disposed. In other embodiments, the present invention provides a method of fabricating an article. The method comprises steps of providing a first segment and a second segment, the first and second segments comprised of a rigid plastic material and having complementary features that allow mating assembly of the first and second segments in a predetermined arrangement and mating the first and second segments to form a core comprising a channel traversing at least a portion of an interface between the first and second segments. The method can further comprise a step of injecting an elastomeric material into the channel to form an elastomeric material network between the first and second segments. In some embodiments, the method can still further comprise a step of forming a sheathing comprised of the elastomeric material on at least a portion of an outer surface of the core.

According to one or more embodiments, the present invention can utilize transfer molding, injection molding, compression molding, reaction-injection molding, over-molding techniques, as well as combinations thereof. The present invention can be utilized to fabricate articles comprised of any combination of plastic, thermoplastic, thermosetting, as well as elastomeric or resilient materials. In some embodiments, the present invention provides assembly of rigid segments into a rigid core secured together with an elastomeric material.

Figure 2:
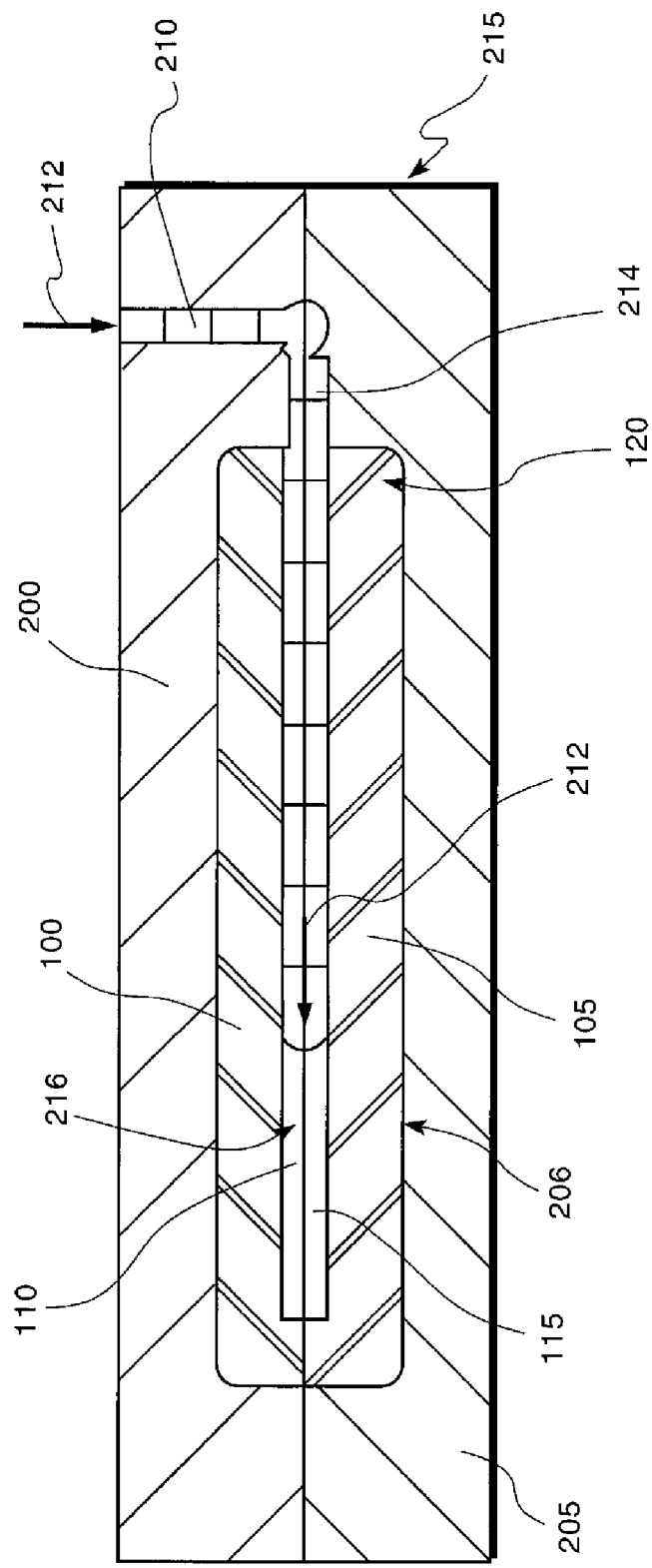
FIG. 2 is a cross-sectional view of the article of FIG. 1 showing the fabrication of the mating segments by injection bonding with a material that is introduced between the segments according to one or more embodiments of the present invention.

According to one or more embodiments of the present invention, and as illustrated in FIG. 1, a first segment 100 and a second segment 105 can have recessed structures 110 and 115 that form or define channels or passages in or when segments 100 and 105 are assembled together in a complementary mating arrangement to form, for example, a rigid component or core 120, also shown in a cross-sectional view in FIG. 2. The first and second assembled segments 100 and 105 can be placed in an apparatus that provides for a compressive force or load and/or heating of the assembled segments. The rigid segments can be heated in the mold assembly. A material, typically a flowable material, can be introduced into the channel defined by grooves 110 and 1115 when segments 100 and 105 are assembled together to form mated rigid component 120.

For illustrative purposes only, the flowable material in accordance with the present invention will be referred to as an elastomeric material. The present invention fully contemplates utilizing other similar materials. Such materials include thermosetting materials, thermoplastic materials and blends, copolymers, or mixtures thereof. Such material also includes reactive materials that form crosslinking chemical bonds. The elastomeric material typically flows at elevated temperatures and flows under pressure but can become solid or non-molten at ambient or low temperatures. The elastomeric material can become a solid, non-flowing material as a result of a physical or chemical change or reaction. For example, the elastomeric material can comprise a thermosetting polymer material that can form crosslinking chemical bonds between polymeric chains thereby transforming the physical properties of the elastomeric material.

As shown in the embodiment depicted in FIG. 2, an elastomeric material 210 can be introduced, shown generally by arrows 212, into a gate, sprue or runner 214 defined in a mold assembly 215, which is typically comprised of mold segments 200 and 205. Typically, elastomeric material 210 flows under pressure and/or at elevated temperatures. The elastomeric material 210 can further flow into a channel 216 defined in or between, for example, mated segments 100 and 105, shown disposed in a mold cavity 206 and defined by mold segments 200 and 205. The elastomeric material can also fill cavities defined in the mated segments 100 and 105 to form internally disposed structures (not shown).

Figure 3:
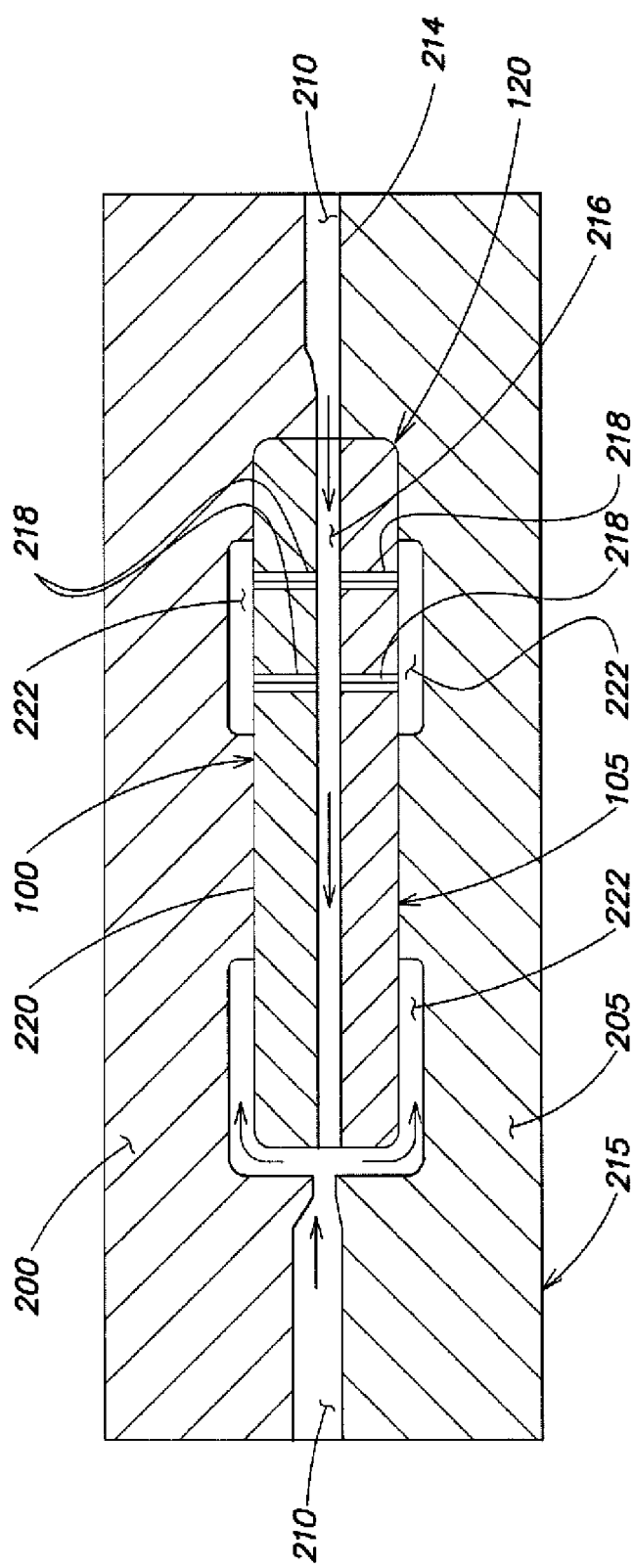
FIG. 3 is a cross-sectional view of an article showing the fabrication of mating segments by injection bonding and encapsulation with a material that is introduced between the segments according to one or more embodiments of the present invention.
Figure 4:
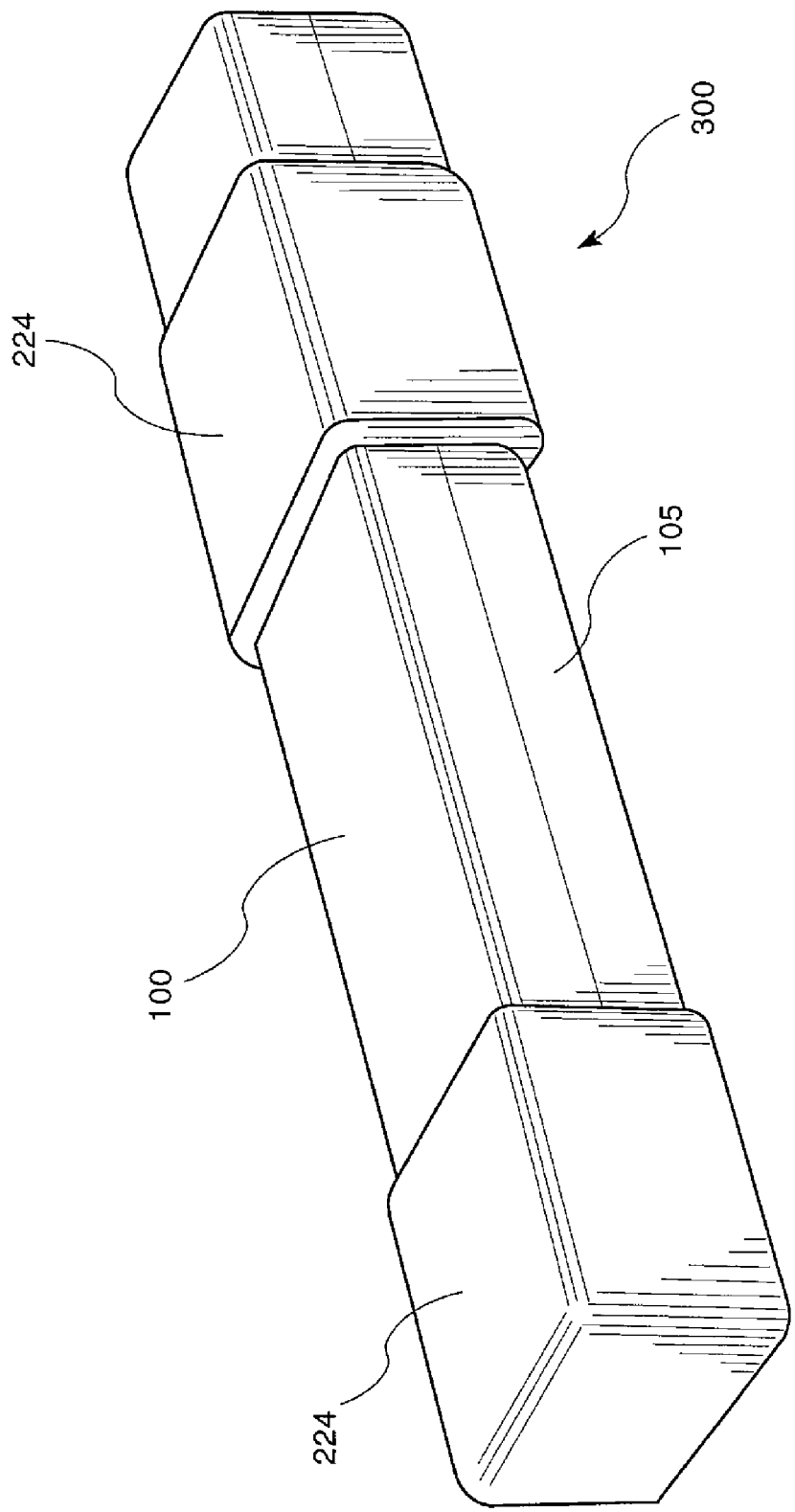
FIG. 4 is a perspective view of an injection bonded article having a sheathing according to one or more embodiments of the present invention.

In other embodiments of the present invention, the elastomeric material 210 can be used to form or over-mold on mated segments 100 and 105 to partially or completely encapsulate an outer surface 220 of the rigid component 120. For example, as shown in the cross-sectional view depicted in FIG. 3, rigid segments 100 and 105, which can be assembled in a predetermined fashion and disposed in a mold cavity 206, defined by mold segments 200 and 205 in mold assembly 215. The mold assembly 215 having rigid segments 100 and 105 disposed therein can be heated to elevated temperatures in an oven or by heated plattens of a press (not shown). Elastomeric material 210 can be introduced into runners 214 defined in one or both mold segments 200 and 205 by techniques including, but not limited to transfer, injection, reaction and compression molding. Elastomeric material 210 can enter into channel 216. Elastomeric material 210 can be over-molded around an outer surface 220 of one or both mated segments 100 and 105 by flowing into and through secondary channels 218, defined in one or both rigid segments 100 and 105, and flow into a secondary cavity 222 to form a sheathing structure 224 (shown in FIG. 4) when the elastomeric material 210 cools to a solid. The secondary cavities 222 can further provide complementarily-shaped features (not shown) such that when elastomeric material 210 fills cavity 222, it conforms and assumes the shape of the complementary features thereby providing for structures formed on surface 220 of the rigid component. For example, cavity 222 can be shaped to provide a seal that can be formed on a surface of the rigid component. As shown in FIG. 4, the present invention provides an injection bonded article 300 having mated rigid segments 100 and 105 and comprising a sheathing 224 made of an elastomeric material, which can also form a network disposed between the mated rigid segments. The elastomeric material network and the sheathing can be formed as a unitary structure.

According to some embodiments, the elastomeric material comprises a thermoplastic elastomer material (TPE). In yet other embodiments, the rigid segments are comprised of a thermoplastic material. In still other embodiments, the thermoplastic material and the rigid segments are comprised of a thermoplastic material such as a thermoplastic elastomer material. For example, the TPE and the mating segments may comprise a polyolefin polymer that can be melted at processing temperatures. Thus, in accordance with one or more embodiments of the present invention, molten TPE can be introduced into in channels 216 and 218 at a temperature that can melt, at least locally, the respective contacted, wetted surfaces of mating segments 100 and 105. Once the TPE has at least partially filled channels 216 and 218 and, optionally, cavities 222, the assembly can be cooled and removed from mold assembly 215. Upon cooling a thermal bond can be formed between the rigid segments, the sheathing and the TPE forming the elastomeric material network disposed between the rigid segments.

In accordance with one or more embodiments, the present invention provides an electrodeionization apparatus spacer comprising a rigid core and an elastomeric material network. The elastomeric material network can be disposed within the rigid core. In some embodiments, the elastomeric material can form a seal on at least a portion of the surface of the rigid core. The elastomeric material can further be formed into sealing structures, such as seals, providing fluid isolation of structures defined in the rigid core. The electrodeionization spacer can have one or more resin cavities defined therein and which can be in fluid communication with at least one of an inlet port and an outlet port, each also defined in the rigid core. Other structures and features can also be defined in or on the rigid core. For example, the rigid core can further include throughports defined in the rigid core that can act as a channel that can permit fluid communication through the rigid core.

In some embodiments, one or more ports defined in the rigid core can have at least one seal disposed at a periphery of the one or more ports. For example, an inlet port seal can be disposed on a surface of the rigid core around a periphery of an inlet port. In some embodiments, the seal is comprised of an elastomeric material and in other embodiments, the seal is comprised of the elastomeric material that forms an elastomeric material network. The electrodeionization spacer can include a peripheral seal disposed on a surface of the rigid core.

In still other embodiments, the elastomeric material forms a sheath that encapsulates, at least partially, a surface of the rigid core. In yet other embodiments, the elastomeric material can further define structures within the rigid core that seals and fluidly isolates channels or other structures defined within the rigid core. For example, the elastomeric material can define a network that comprise seals fluidly isolating any one of the resin cavities, the inlet or outlet ports, as well as any throughports and manifolds, channels or conduits defined in the rigid core.

The elastomeric material can be any resilient material that is physically and chemically compatible for use in the electrodeionization apparatus. The elastomeric material can comprise any material that is moldable at suitable processing conditions. For example, the elastomeric material can comprise a thermoplastic material, a thermosetting material or a combination or blend thereof. Further, the elastomeric material can be a chemical or mechanical blend of one or more thermoplastic or thermosetting polymers. Examples of elastomeric materials that may be suitable for use in electrodeionization apparatus include, but are not limited to, polymers or copolymers of styrene, polyester, polyurethane, polyamide and polyolefin.

Figure 5:
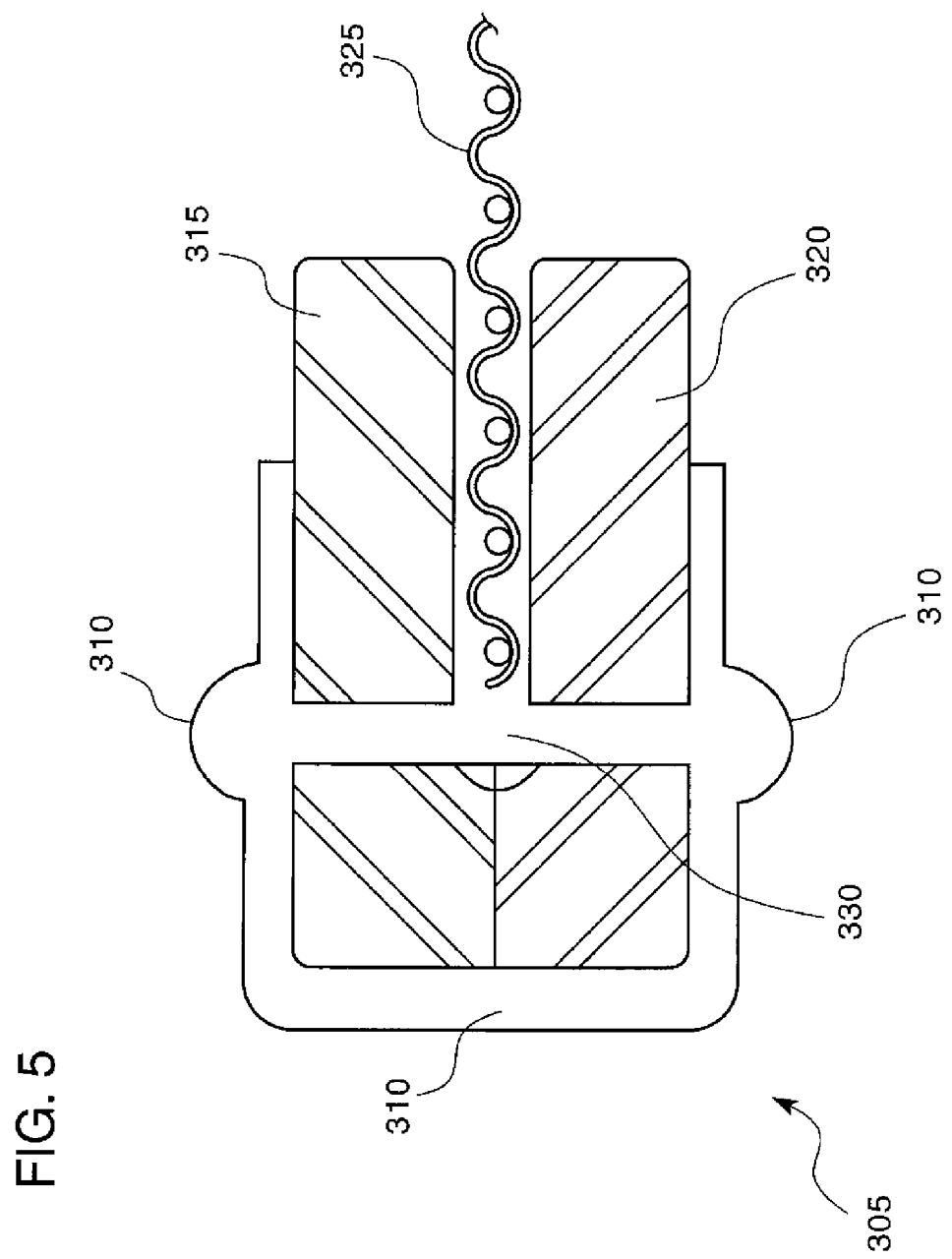
FIG. 5 is a cross-sectional view of an injection bonded article showing an assembly of plastic parts bonded with an elastomeric material which also encapsulates a portion of an outer surface of the plastic components according to one or more embodiments of the present invention.

FIG. 5 shows a cross-section of an assembly according to one or more embodiments of the present invention. An injection bonded article 305 shows an assembly of three plastic parts, or rigid segments, bonded together with an elastomeric material which also at least partially encapsulates an outer surface of the segments. Rigid segments 315 and 320 can be secured together along with a screen 325 sandwiched therebetween. An elastomeric material forms an internal network 330 between rigid components 315 and 320 in such a way that it can mechanically and/or chemically bond screen 325 between rigid segments 315 and 320. The elastomeric material can also form a seal 310 on an outer surface of mated segments 315, 320, and 325. The elastomeric material can also partially encapsulate the assembly to form a sheath 310.

Figure 6:
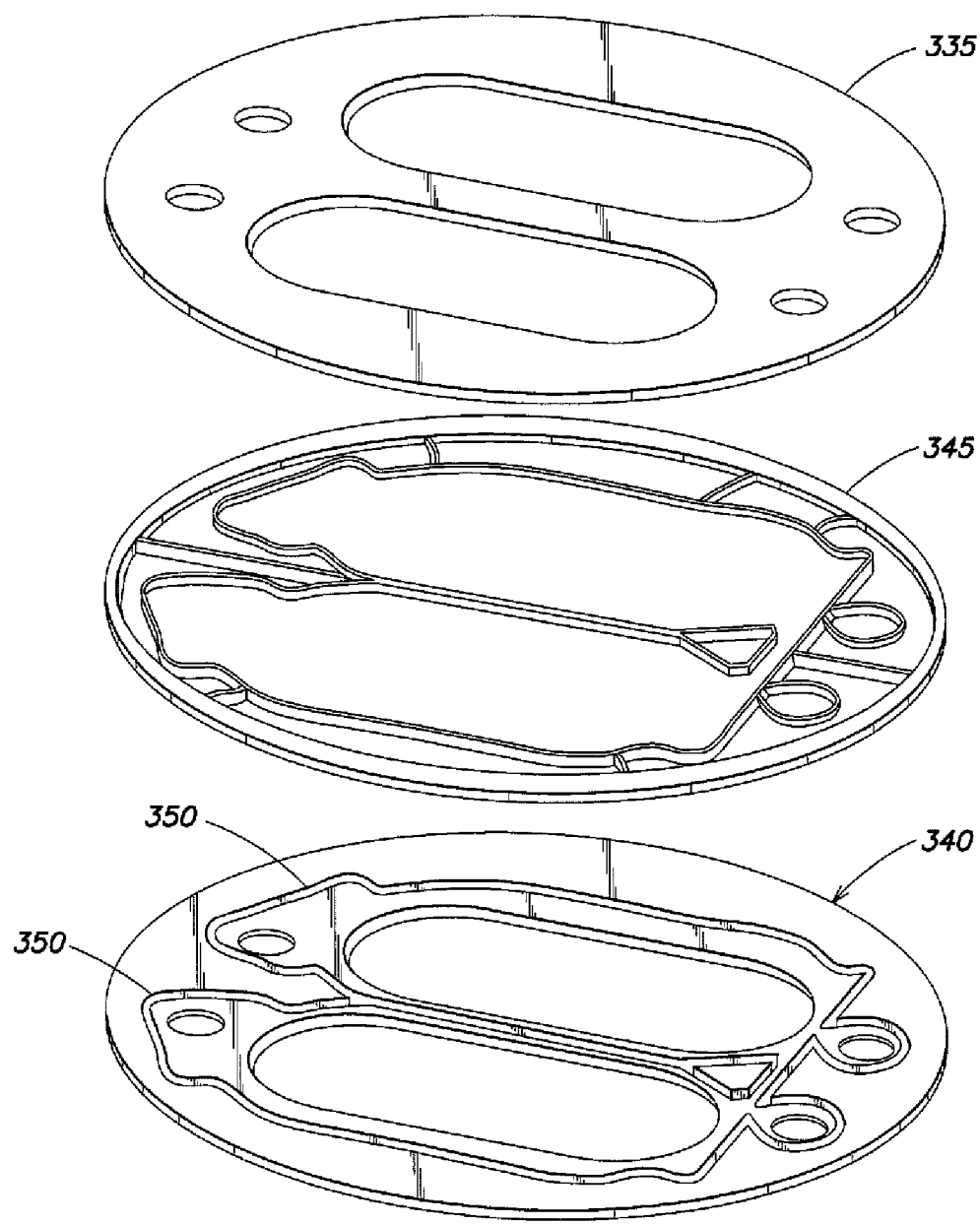
FIG. 6 is an exploded view of an electrodeionization apparatus spacer according to one or more embodiments of the present invention.

In accordance with one or more embodiments of the present invention, FIG. 6 shows an exploded view of an electrodeionization apparatus spacer comprising a first section or segment 335 and a second section or segment 340 that can mate in a complementary arrangement to form a rigid core secured together with an elastomeric material network 345. The electrodeionization apparatus spacer can be fabricated by providing the first mating segment 335 which can be fabricated by techniques known in the art such as, but not limited to, molding or machining a rigid material. Similarly, second section 340 can be fabricated and provided in the same manner. The electrodeionization apparatus spacer can be constructed by disposing mating first and second segments 335 and 340 in an appropriate mold (not shown) and injecting an elastomeric material to form elastomeric material network 345 in internal structures, such as channels 350, defined by the assembly of segments 335 and 340. The elastomeric material network can secure complementary mating first and second segments 335 and 340. In some embodiments, the complementary mating first and second sections as well as the elastomeric material comprise a thermoplastic material.

The elastomeric material can comprise any resilient material that is chemically and mechanically stable during use. In some embodiments, the elastomeric material has a Shore A Hardness of between about 40 to about 90, preferably from about 50 to about 80, and more preferably from about 60 to about 75, as determined by ASTM D 2240 or TPE 0169. In some embodiments, the elastomeric material has a hardness property that is sufficient to allow compression without significant material flow under pressure. In some embodiments, the elastomeric material has a resistance to compression set sufficient to prevent fluid from flowing therethrough while under pressure. In yet other embodiments, the rigid material and the elastomeric material are comprised of a material that is suitable for use in food or pharmaceutical applications. In some embodiments, the elastomeric material can comprise a thermoplastic or thermosetting polymer that is flexible relative to the rigid material during operation or use. Examples of elastomeric materials include, but are not limited to, resilient materials such as thermoplastic elastomer materials like styrene block co-polymers, co-polyesters, polyurethane, polyamide, polyolefin, and other thermoplastic or thermosetting polymers. An example of a suitable elastomeric material includes, but not limited to, SANTOPRENE® thermoplastic elastomer resins available from Advanced Elastomer Systems, Akron, Ohio; SOFTFLEX® thermoplastic elastomer resins available from Network Polymers, Inc., Akron, Ohio; STARFLEX® thermoplastic elastomer resins available from Star Thermoplastic Alloys & Rubber, Inc., Glen View, Ill.; VERSALLOY® XL9000 thermoplastic elastomer resins, available from GLS Corporation, McHenry, Ill.; MORTHANE® resins available from Rohm and Haas Company, Philadelphia, Pa.; and ESTANE® thermoplastic polyurethane resins available from The B.F. Goodrich Company, Cleveland, Ohio or Noveon, Inc., Cleveland, Ohio. The elastomeric material can also comprise reinforced, non-reinforced, filled or unfilled thermosetting vulcanizates, or blends and mixtures thereof, such as natural rubber as well as styrene-butadiene, polybutadiene, ethylene/propylene, butyl, chlorobutyl, polyisoprene, nitrile, polyacrylate, chloroprene, chlorosulfonated polyethylene, polysulfide, silicone, and fluorocarbon polymers.

During fabrication, the elastomeric material can locally melt, for example during molding, a portion of the rigid first or second sections. Typically, upon cooling, the complementary mating first and second sections are fused together or at least fused or secured to the non-molten elastomeric material.

In other embodiments, the rigid core can comprise a material that is sufficiently inflexible and can maintain its general shape under force or pressure during use or service as in, for example, an electrodeionization apparatus. The rigid material can comprise a material that is resistant to stress relaxation and able to withstand conditions during operation of an electrodeionization apparatus. In some embodiments, the rigid material is electrically insulating and chemically resistant to high or low pH liquids. In yet other embodiments, the rigid material is inflexible relative to the elastomeric material, is thermally stable, chemically resistant, heat resistant, and dimensionally stable during use or in service. Other properties that may be relevant to determining applicability includes, but is not limited to, the mechanical properties, such as rigidity, impact resistance, surface quality, wear resistance; chemical properties, such as flame retardance, conductivity, compatibility, and weight; dielectric; weathering; and processing properties, as well as cost and availability of the material. The rigid material can be fabricated from any suitable material such as, but not limited to, thermoplastic, thermosetting, or blends or copolymers of polymeric materials, as well as metals, or combinations or alloys thereof, so long as it is suitable for its intended use. In some embodiments, the rigid material is comprised of a reinforced thermoplastic or thermosetting material. For example, the rigid material can be reinforced by compounding, blending, fibers and/or minerals in a polymeric matrix. Examples of other suitable reinforcing fillers include, but are not limited to, glass fibers, aramid fiber, silica, and carbon black. Examples of suitable polymeric materials include, but are not limited to polypropylene, polyethylene, polycarbonate, nylon, polyacryletherketone, sytrene-acrylonitrile, cyclic olefin copolymer, polyimide, polysulfone, polyphenylsulfone, polyphenylene oxide, polyphenylene ether, chlorinated poly(vinyl chloride), polyphenylene sulfide, polyetherimide, polyetherketone, polyamide, polyimide, polybenzimidazole, and polystyrene, as well as blends, copolymers, or mixtures thereof. The rigid segments can also comprise a thermosetting polymeric material such as, but not limited to, epoxy, urethane, and phenol, as well as blends or copolymers thereof. Suitable commercially available material includes RADEL® polyphenylsulfone resins available from Solvay Engineered Polymers, Auborn Hills, Mich. as well as NORYL® polyphenylene-based resins available from GE Plastics, Pittsfield, Mass.

Selection of suitable rigid material/elastomeric material sets depend on several factors including those relevant to fabrication, cost, and conditions in use. For example, at least one of the rigid segments comprises a glass-filled polypropylene and the elastomeric material comprises a thermoplastic elastomer comprising ethylene propylene diene rubber and polypropylene. Particular examples of compatible material sets include, but are not limited to those listed in Table 1.

TABLE 1

Suitable elastomeric material and rigid material combinations.

| Elastomeric Material | Rigid Material |
|---|---|
| Polypropylene based plastic materials such as SANTOPRENE ® B100 series, grades XB211-55B100 plastic material, available from Advanced Elastomer Systems, Akron, Ohio | Acrylonitrile-butadiene-sytrene (ABS) based plastic materials Polycarbonate based plastic materials ABS/polycarbonate based plastic materials Polystyrene based plastic materials, acrylic based plastic materials Acrylic-styrene-acrylonitrile (ASA) based plastic materials Polyethylene terephthalate (PET) based plastic materials |
| Styrene-ethylene-butylene-styrene (SEBS) based plastic materials such as THERMOLAST ® K plastic material available from Kraibur & Waldkraiburg, Germany | Acetal polymer based plastic materials such as CELCON ® or HOSTAFORM ® plastic material available from Ticona US, Summit, New Jersey |
| Polypropylene based thermoplastic vulcanizate material which require heat and pressure available from | Anodized aluminum, cold rolled stainless steel, brass, copper, and other coated nylon and polyester |

TABLE 1-continued

Suitable elastomeric material and rigid material combinations.

| Elastomeric Material | Rigid Material |
| --- | --- |
| Advanced Elastomer Systems, Akron, Ohio | fabrics |
| Thermoplastic elastomeric materials such as ESTAGRIP ® plastic available from B. F. Goodrich, Cleveland, Ohio | ABS based plastic materials, polycarbonate based plastic materials<br>ABS/polycarbonate based plastic materials, rigid polyvinyl chloride (PVC) based plastic materials<br>PVC/ABS blend based plastic materials<br>Polyphenylene oxide/polystyrene blend (PPO/PS) based plastic materials |
| Thermoplastic elastomeric materials such as VERSAFLEX GLS OM600 plastic available from GLS Corporation, McHenry, Illinois materials | Nylon 6/6 resin, nylon 6 resin and other similar engineering plastic materials |

The rigid segments can be fabricated by techniques known in the art. For example, rigid segments comprised of a polymeric material can be fabricated by molding the polymeric material. Features, such as protrusions and indentations, on the rigid component can be created by casting or molding the polymeric material in a mold having corresponding features. In some cases, such features can be created by machining the molded rigid component. Examples of fabricating techniques include, but not limited to, extrusion, wherein the polymeric material is forced through a die that shapes the rigid segment; lamination, wherein layers or sheets of polymeric material are joined to form a unitary component; and molding, such as compression, transfer, and/or injection molding, wherein pressure is applied to promote flow of the polymeric material in to a cavity.

Further, the use of adhesives to promote bonding between the rigid material and the elastomeric material are contemplated by the present invention. For example, rigid segments can be coated with adhesive or adhesion promoters known in the art before injecting the elastomeric material as described in, for example, "Assembly Bonding of SANTOPRENE® Thermoplastic Rubber," Advanced Elastomer Systems Technical Correspondence, TCD00901, 2001. Alternatively, the selection of particular sets that do not form thermal bonds is also contemplated by the present invention. Such embodiments may be advantageously utilized in applications such as but not limited to articles that require disassembly for replacement or repair of components. An example of a suitable non-bonding pair includes SANTOPRENE® 271-73 thermoplastic elastomer from Advanced Elastomer Systems, Akron, Ohio and glass-filled NORYL® GFN-2 polyphenylene oxide available from GE Plastics, Pittsfield, Mass.

Fabrication of components with SANTOPRENE® thermoplastic rubber material has been explained in technical literature including "Processing and Mold Design Considerations for O-Ring Seals Molded in SANTOPRENE® Rubber," Advanced Elastomer Systems Technical Correspondence, TCD07889, 1998; "Design Considerations for Diaphragms," Advanced Elastomer Systems Technical Correspondence, TCD00500, 2000; "Assembly Bonding of SANTOPRENE® Thermoplastic Rubber," Advanced Elastomer Systems Technical Correspondence, TCD00901, 2001; "Sealing with SANTOPRENE® Thermoplastic Rubber," Advanced Elastomer Systems Technical Correspondence, TCD02001, 2001; "SANTOPRENE® Thermoplastic Rubber for Material Transfer Hose," Advanced Elastomer Systems Technical Correspondence, TCD1901, 2001; "Shrinkage Rates for Injection Molding of SANTOPRENE® Thermoplastic Rubber, Advanced Elastomer Systems Technical Correspondence, TCD00601, 2001; "Welding SANTOPRENE® Thermoplastic Rubber," Advanced Elastomer Systems Technical Correspondence, TCD01401, 2001; and "Grip Design Made Easy," Advanced Elastomer Systems, AD1095-0201, 2001, each of which are incorporated herein by reference in their entireties.

In accordance with one or more embodiments, the present invention can be used in conjunction with apparatus relevant to electrically driven separation techniques. For example, the present invention can be relevant to articles or components utilizing electrodeionization technology. Electrodeionization apparatus can be used to remove ionizable species from liquids through the use of electrically active media under the influence of an electrical potential to influence the transport of the ionizable species. The electrically active media may function to alternately collect and discharge ionizable species, or to facilitate the transport of ions continuously by ionic or electronic substitution mechanisms. Electrodeionization apparatus can include media having permanent or temporary charge and can be operated to cause electrochemical reactions designed to achieve or enhance performance. These devices also include electrically active membranes such as semi-permeable ion exchange membranes, ion-selective membranes, or bipolar membranes.

In accordance with one or more embodiments, the present invention can be used to fabricate articles or component utilized in an electrodeionization apparatus. Electrodeionization apparatus typically include ion-depleting (depleting) compartments and ion-concentrating (concentrating) compartments. Adjacent compartments typically have an ion-selective membrane positioned therebetween. The assembly of concentrating and depleting compartments, typically known as the stack, may be in alternating order or in any of various arrangements necessary to satisfy design and performance requirements. The stack arrangement is typically bordered by an electrode compartment at one end and another electrode compartment at an opposite end. Typically, end blocks are positioned adjacent to electrode compartment, which contain the electrodes. The concentrating and depleting compartments are typically defined by spacers or structures that offset and support ion-selective membranes. The spacer, along with the ion-selective membrane bonded or sealed thereon, define a cavity which may serve as a concentrating or a depleting compartment, depending on operating conditions. A typical electrodeionization apparatus has alternating electroactive semi-permeable anion- and cation-selective membranes. The spaces between the ion-selective membranes are typically configured to create liquid flow compartments. A transverse DC electrical field is imposed by an external power source through electrodes at the bounds of the compartments. Upon imposition of the electric field, ions in the liquid to be treated in one compartment, the ion-depleting compartments, are attracted to their respective attracting electrodes. The ions typically migrate through the ion-selective membranes into the adjoining compartments so that the liquid in such adjoining ion-concentrating compartments become ionically concentrated. The volume within the depleting compartments and, in some cases, within the concentrating compartments, includes electrically active media. In electrodeionization apparatus, the electroactive media may include intimately mixed or layered anion and cation exchange resins. Such electroactive media typically enhances the transport of ions within the compartments and may participate as a substrate for controlled electrochemical reactions. As mentioned above, electrodeionization devices have been described by, for example, Giuffrida et al. in U.S. Pat. Nos. 4,632,745, 4,925,541 and 5,211,823, by Ganzi in U.S. Pat. Nos. 5,259,936 and 5,316,637, by Parsi et al. in U.S. Pat. No. 5,066,375, by Oren et al. in U.S. Pat. No. 5,154,809 and by Kedem in U.S. Pat. No. 5,240,579, each of which is incorporated herein by reference in their entireties.

The concentrating and depleting compartments can be filled with cation exchange resins, anion exchange resins or a mixture of both. The cation and anion exchange resins can be arranged as mixtures or as layers within any of the depleting, concentrating and electrode compartments so that a number of layers in a variety of arrangements can be assembled. The use of mixed bed ion exchange resins in any of the depleting, concentrating and electrode compartments, the use of inert resin between layers of beds of anionic and cationic exchange resins, as well as the use of various types of anionic and cationic exchange resins, such as those described by DiMascio et al., in U.S. Pat. No. 5,858,191, which is incorporated herein by reference in its entirety, is contemplated to be within the scope of the invention.

Figure 7:
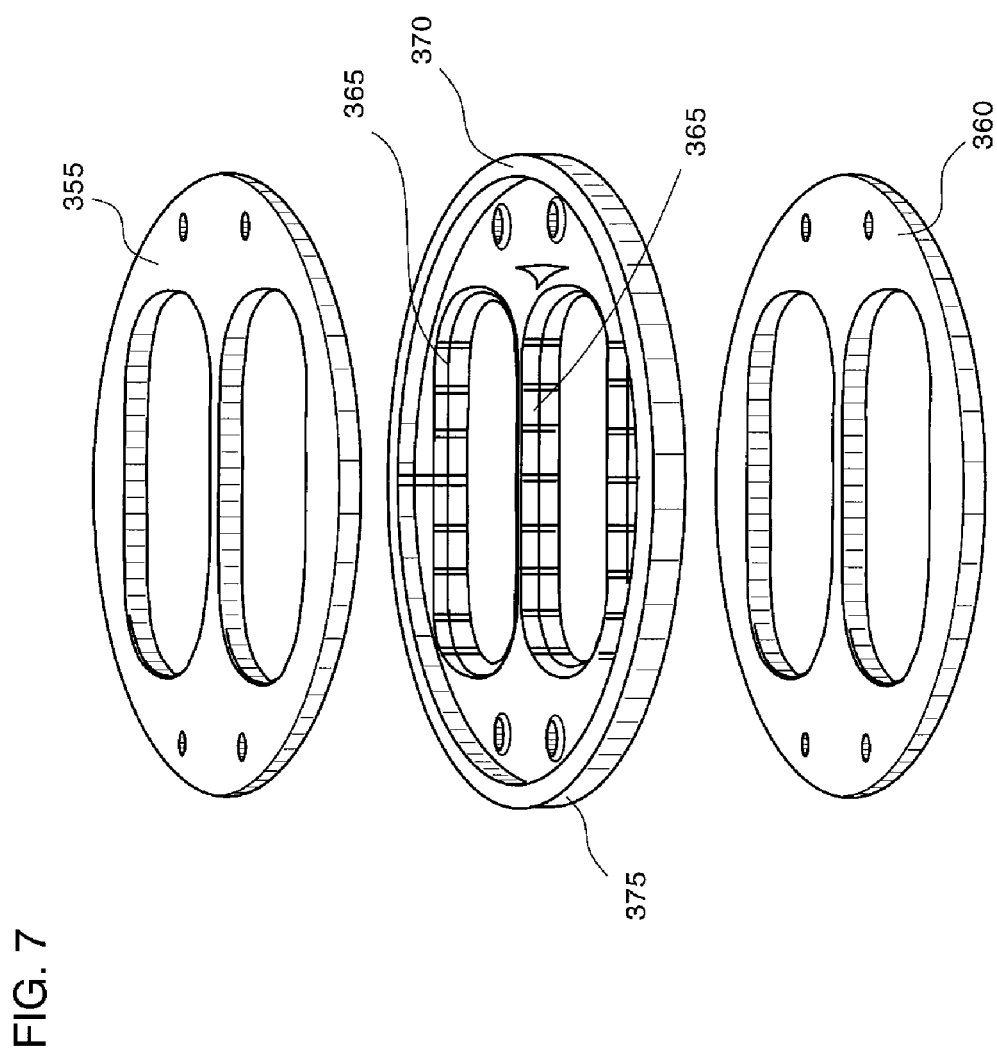
FIG. 7 is an exploded view of an electrodeionization spacer according to one or more embodiments of the present invention.

In accordance with another embodiment of the present invention, a depleting compartment spacer, as illustrated in the exploded view of FIG. 7, shows a rigid core comprised of first section or segment 355 and second section or segment 360 secured together with an elastomeric material network 365 that also forms a seal 370 on at least a portion of the surface of the rigid core. In some cases, the elastomeric material further encapsulates the rigid core and forms a sheath 375 on at least a portion of a surface of the rigid core as a unitary elastomeric material.

The present invention can be further understood through the following examples, which are illustrative in nature and do not limit the scope of the invention.

EXAMPLE 1

Kitchen Article Fabricated by Injection Bonding and Over-molding Techniques.

Figure 8C:
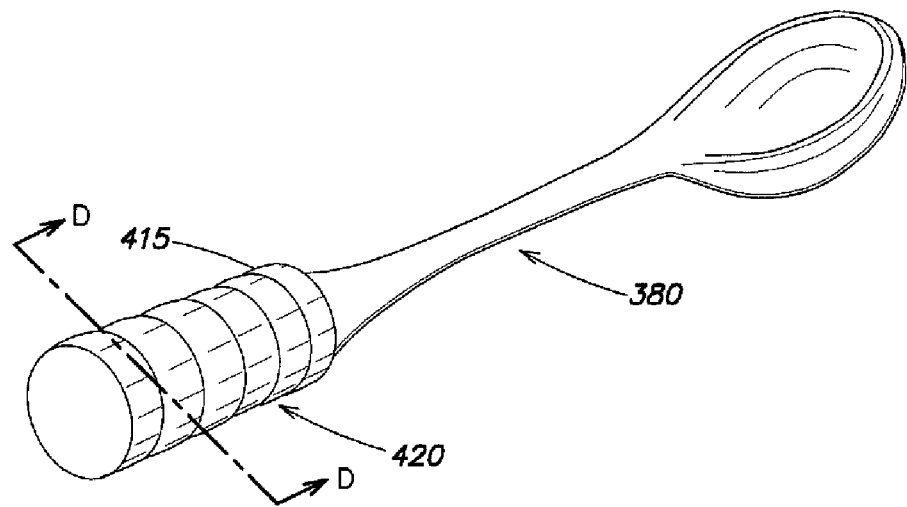
Figure 8D:
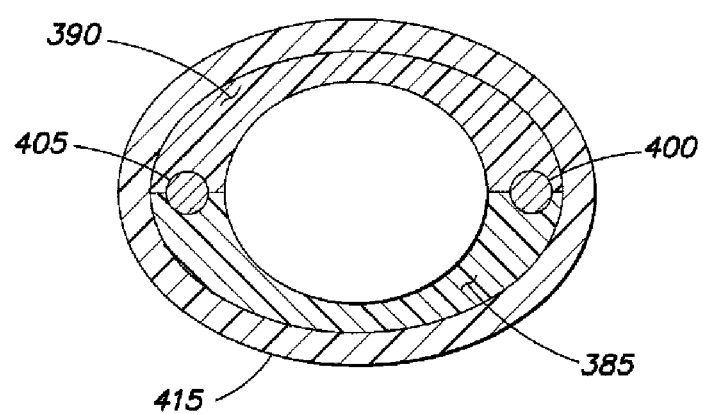

An injection bonded article is illustrated in FIGS. 8A-8D wherein a kitchen article can be fabricated according to the following invention. FIG. 8A is an exploded view of a rigid components of kitchen article 380 shown in FIG. 8C, showing a first segment 385 comprised of a nylon resin and a second segment 390 comprised of a nylon resin. FIG. 8C illustrates an assembled kitchen article with a grip section 420 that can be formed on the rigid core. FIG. 8D is a cross-sectional view across section d-d of FIG. 8C showing the grip section of the kitchen article. The complementary mating segments 385 and 390 can be assembled into kitchen article 380.

The complementary mating first and segments 385 and 390 can be fabricated by molding the nylon resin in respective molds (not shown). The first segment 385 and second segment 390 can have complementary features, such as protrusion and indentations (not shown), such that segments 385 and 390 can be complementary mated to form a rigid article 380. First segment 385 can have a first channel 400 wherein molten TPE resin, such as SANTOPRENE® 191-70A, can be introduced by injection molding techniques. The TPE resin is selected to bond with the rigid segments 385 and 390. Rigid segments 385 and 390 are placed into a mold (not shown). The molten TPE resin, at a temperature of about 260° C. to about 280° C., is injected into the mold and fills and flows within channel 400. Continued injection of the molten TPE resin allows it to flow into secondary channels 405 and further over a portion of an outer surface 410 of mated rigid segments 385 and 390 to form sheathing 415. In this example, injection of the TPE resin and over-molding thereon over a portion of the outer surface of the mated rigid segments can be performed to fabricate kitchen article 380 having a grip section 420 formed on a rigid core.

EXAMPLE 2

In-Line Separation Device Fabricated by Injection Bonding and Over-molding Techniques.

Figure 9:
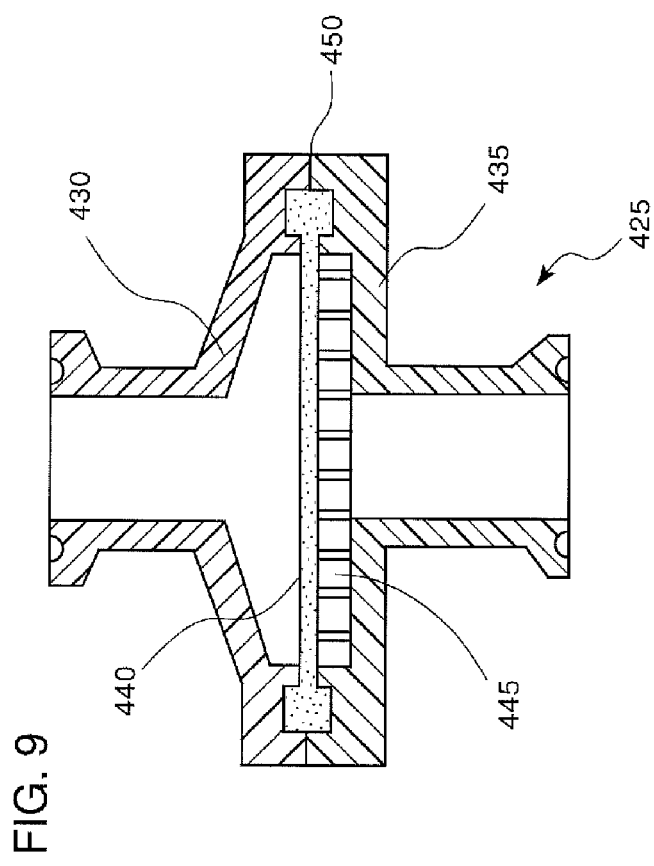
FIG. 9 is a cross-sectional view of an in-line separation device according to one or more embodiments of the present invention.

This example describes an injection bonded article, illustrated in FIG. 9 showing an in-line separation device 425 in accordance with the present invention. Separation device 425 comprises a first rigid segment 430 comprised of a polypropylene plastic resin and a mating, complementary second rigid segment 435 also comprised of a polypropylene plastic resin. Disposed at an interface defined between mating rigid segments 430 and 435 is a separation medium 440. Also shown in FIG. 9 is a support grid 445 disposed to provide structural support to separation medium 440 during use of separation device 425. Securing the first and second rigid segments 430 and 435 as well as the separation medium 440 and support grid 445 is an elastomeric material comprised of a TPE resin, such as SANTOPRENE® 271-73 thermoplastic elastomer resin.

To fabricate the separation device 425, the first and second segments are placed in a mold (not shown). The elastomeric material is injected into channel 450 defined between rigid segments 430 and 435. The particular TPE material and the particular rigid segment material are selected to bond, such as by forming a mechanical, chemical, and/or thermal bond, upon cooling of the assembled separation device 425. Selection of the material comprising separation medium 440 can depend of several factors including, but not limited to, compatibility with the material to be removed or separated as well as the fluid carrier, gaseous or liquid, flowing therethrough, temperature stability during fabrication, and cost. The separation medium 440 can be based on any technique such as filtration, osmosis, diffusion, adsorption, chelation, chemical reaction as well as combinations thereof. Examples of suitable separation medium 440 include, but are not limited to, screens, porous media such as porous plastic or metal, sintered media such as sintered plastic or sintered metal, microfiltration membranes, ultrafiltration membranes, and membranes with grafted and/or implanted chemical groups to selectively bind to species to be removed.

Figure 10:
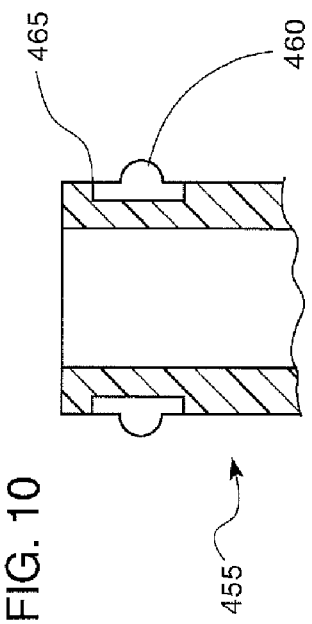
FIG. 10 is a cross-sectional view of a portion of the injection bonded article of FIG. 9.

FIG. 10 is a cross-sectional view of a portion of the separation device 425 illustrated in FIG. 9 showing a connection portion 455 of the first segment 430, having a seal 460 formed on a surface 465 of segment 430. The seal 460 comprises the elastomeric material can be formed by injection molding and over-molding by allowing the thermoplastic material to flow through channels (not shown) to the surface of the rigid segment 430. The features of the seal can be fabricated by having corresponding features of a mold (not shown) during fabrication of the separation device 425 by injection molding and over-molding techniques.

As in Example 1, fabrication techniques of articles based on SANTOPRENE® thermoplastic elastomer materials is described in various technical literature available from Advanced Elastomer Systems, Akron, Ohio.

EXAMPLE 3

Disposable and Sealed Consumer Products

Figure 11A:
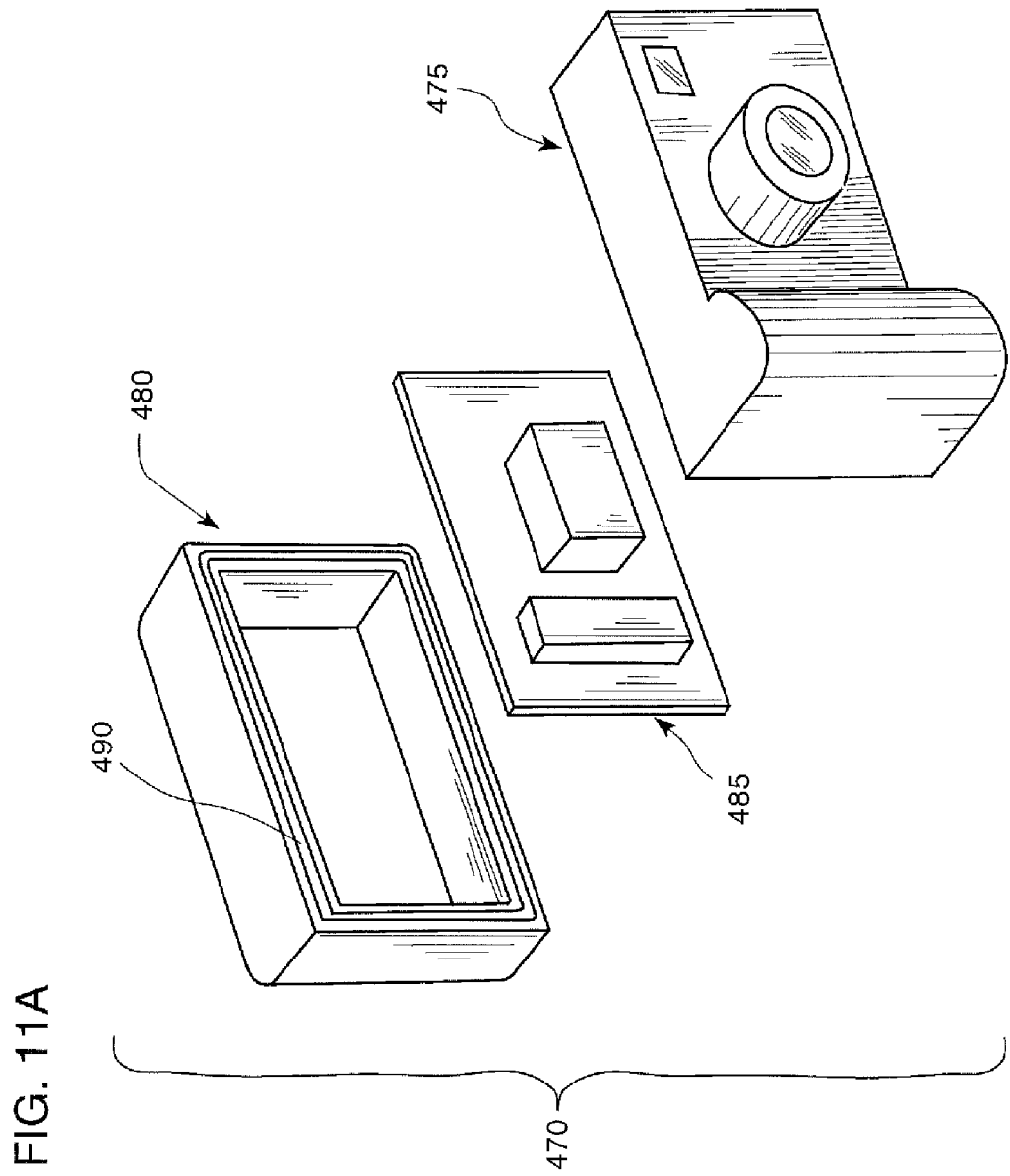

In this example, a disposable or sealed consumer product can be fabricated according to the present invention. Examples of such consumer products include, but are not limited to disposable cameras, including underwater, water-sealed cameras, sealed cellular telephones, as well as sealed rechargeable flashlights. FIG. 11A is an exploded view of a disposable camera 470 (shown in FIG. 11B) having a first rigid segment 475 which can comprise ABS plastic resin and a second rigid segment 480 which can also comprise ABS plastic resin. The first and second rigid segments form a complementary mating rigid core that encapsulates internal component assembly 485. The second rigid segment comprises channel 490 defined thereon.

To fabricate the consumer product, the assembled first and second rigid segments with internal components disposed therein are placed in a mold (not shown). The mold is heated to a temperature appropriate to promote flow of an elastomeric material when injected into the mold to fill channel 490. In the perspective view illustrated in FIG. 11B, a consumer product, such as a disposable camera, shows that the elastomeric material can also be over-molded and encapsulate at least a portion of a surface of the rigid segments 475 and 480 into sheathing 500.

Figure 11C:
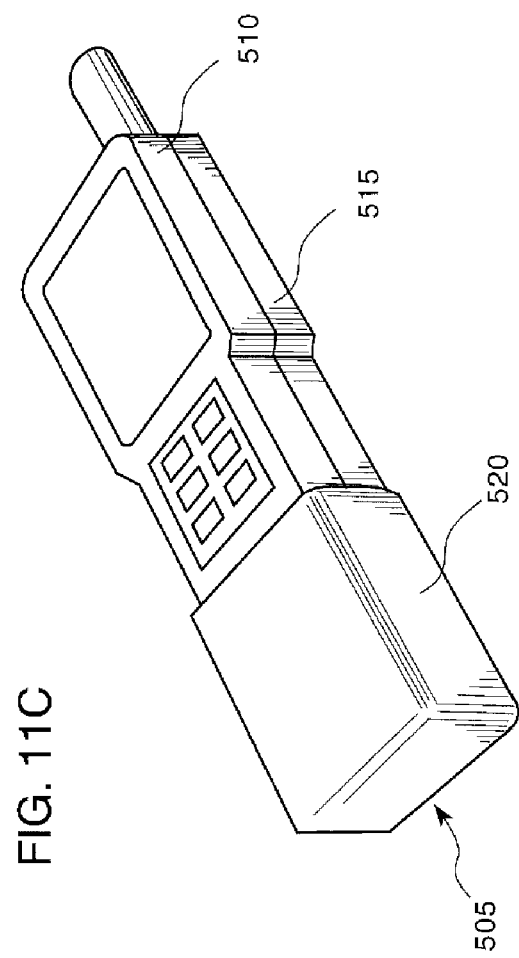
Figure 11B:
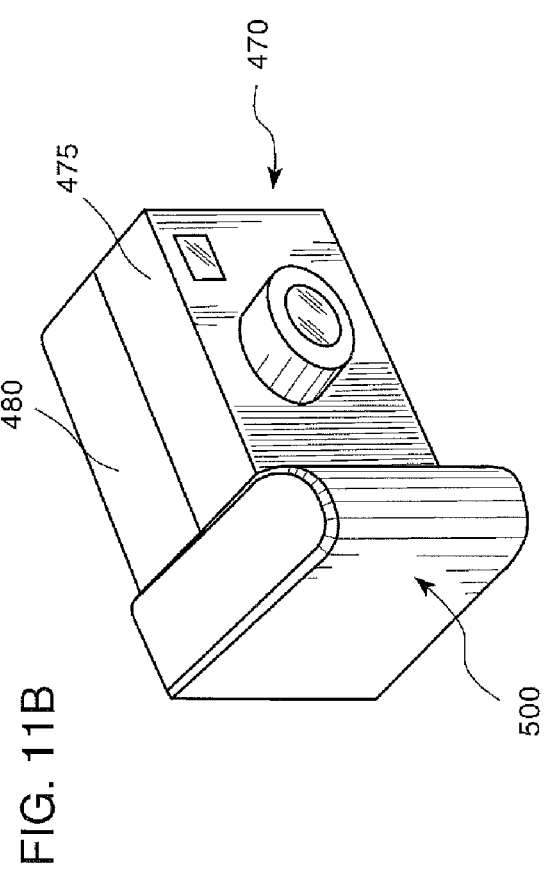
Figure 11D:
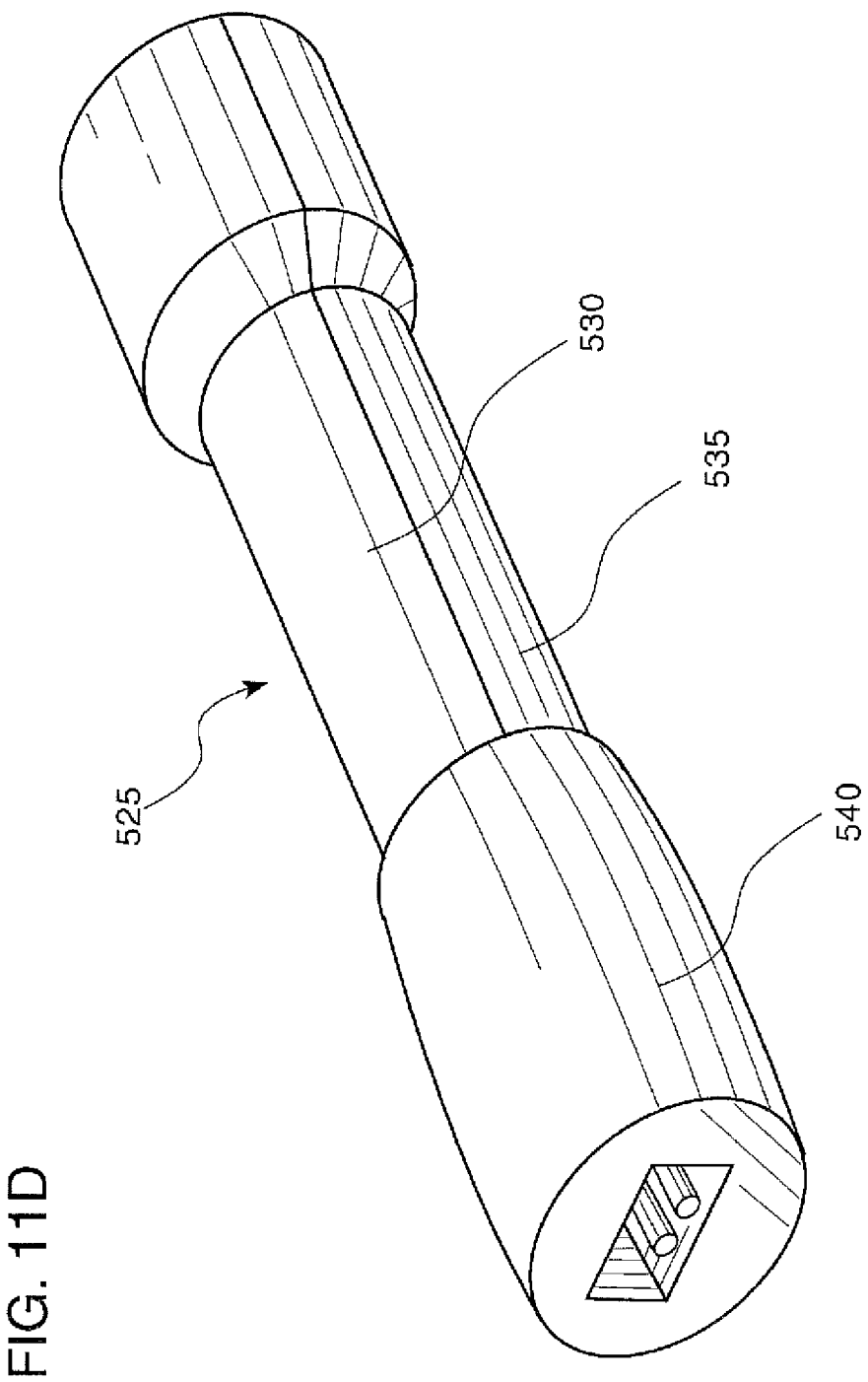

FIGS. 11C-11D are perspective views of consumer products in accordance with the present invention. FIG. 11C shows a sealed electronic device 505 having mated rigid segments 510 and 515 secured together with an elastomeric material network disposed between rigid segments which can also form a sheathing 520 on at least a portion of a surface of the mated rigid segments. FIG. 11D shows a sealed rechargeable flashlight 525 having mated rigid segments 530 and 535 secured together with an elastomeric material network disposed between the rigid segments. The elastomeric material typically also forms a sheathing 540, which can be shaped to as a grip, on at least a portion of a surface of the rigid segments. Further, by forming sheathing 540 to cover the rigid components, the flashlight 525 can be sealed to be watertight. The internally disposed elastomeric material network can form internal seals further ensuring that the internal components are individually or collectively fluidly isolated.

EXAMPLE 4

Electrodeionization Apparatus Spacer Fabrication, Assembly in an Electrodeionization Apparatus and Operation of the Electrodeionization Apparatus.

In this example, an electrodeionization apparatus spacer was fabricated according to the present invention. An electrodeionization apparatus was assembled and comprised a spacer comprised of a rigid core and an elastomeric material network that also formed seals and partially encapsulated the rigid core. The assembled electrodeionization apparatus was placed in service and operated to purify water.

Figure 12:
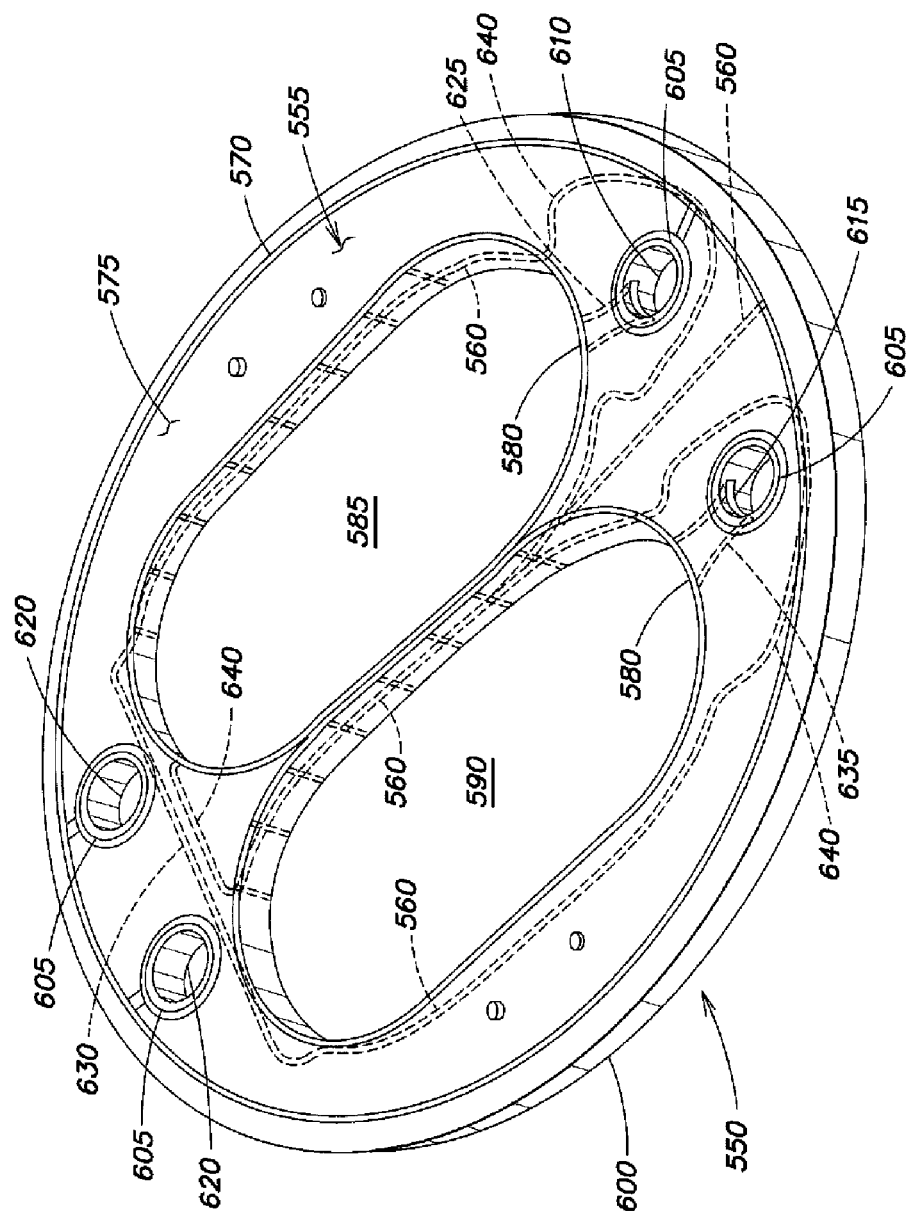
FIG. 12 is a schematic illustration of an electrodeionization apparatus spacer according to one or more embodiments of the present invention.

FIG. 12 is a perspective view showing an electrodeionization apparatus spacer 550 fabricated in accordance with the present invention. The spacer 550 comprised a rigid core 555 and an elastomeric material network 560 within the rigid core. The spacer 550 further had a peripheral seal 570 disposed on a surface 575 of the rigid core 555, and a resin cavity seal 580 around the periphery of resin compartments 585 and 590. The resin cavity seal 580 fluidly sealed adjacent ion-selective membranes (not shown) against the spacer 550. The elastomeric material network 560 also formed a sheathing 600 that encapsulated at least a portion of the rim region of the rigid core 555. The spacer 550 also comprised an external seal 605 disposed around the periphery of an inlet port 610 and an outlet port 615, as well as throughports 620. The throughports 620 provide fluid communication through the spacer and between next adjacent compartments of an electrodeionization apparatus. The elastomeric material network 560, seals 570, 580, and 605, and sheathing 600 were comprised of a unitary elastomeric material formed by injection molding SANTOPRENE® 271-73 thermoplastic elastomer resin into internal channels in the rigid core and further injecting the thermoplastic elastomer resin so as to form the external seals 570, 580, and 605 and the sheathing 600. Also disposed in the rigid core 555 are conduits 625, 630, and 635, which provided fluid communication between inlet port 610, resin cavities 585 and 590, and outlet port 615. An internal seal 640 fluidly isolated internal structures in the rigid core including conduits 625, 630, and 635, as well inlet port 610, resin cavities 585 and 590, outlet port 615, and throughports 620.

The rigid core was fabricated from two rigid segments, as shown in FIG. 7. Rigid segments 355 and 360 were fabricated out of a glass-filled polypropylene compound available from Compounding Solutions, Lewiston, Me. The rigid segments were assembled together in complementarily mating arrangement and disposed in a mold cavity (not shown). SANTOPRENE® 271-73 thermoplastic elastomer resin, available from Advanced Elastomer Systems, Akron, Ohio, was injected into the molded at about 177° C. to about 204° C. (about 350° F. to about 400° F.) to form the elastomeric material network 365 (designated as 560 in FIG. 12). The processing temperature depended on the design and size of the mold and the injection molding machine, and on processing variables such as shot size, mold temperature, injection speed and cycle time. Those skilled in the art would recognize that specific processing conditions would require slight variation depending of such factors to fabricate similar articles. The fabricated spacer was removed from the mold assembly and allowed to cool.

An electrodeionization apparatus was assembled using the electrodeionization apparatus spacer shown in FIG. 12 (herein called the depleting spacer) to define the depleting compartments. A similar spacer, also fabricated according to the present invention and herein called the concentrating spacer, was used to define the concentrating compartments.

FIG. 6 shows a concentrating compartment spacer in accordance with the present invention. This concentrating compartment spacer comprised a rigid core of glass-filled polypropylene compound available from Compounding Solutions, Lewiston, Me. and an unitary elastomeric network of SANTOPRENE® 271-73 thermoplastic elastomer resin, available from Advanced Elastomer Systems, Akron, Ohio.

Figure 13:
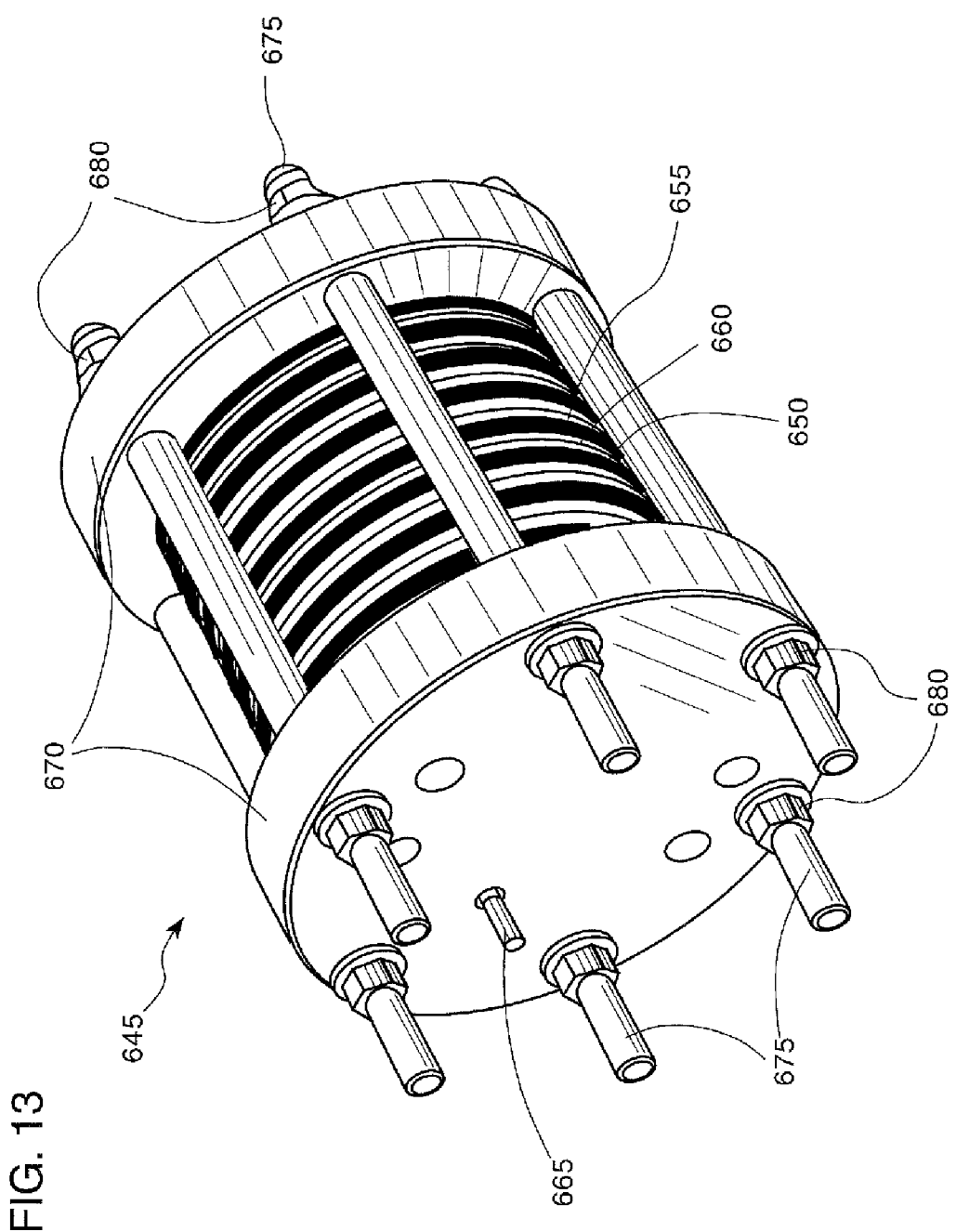
FIG. 13 is a perspective view of an electrodeionization apparatus utilizing the spacer illustrated in FIG. 12 according to one or more embodiments of the present invention.

The assembled electrodeionization apparatus 645, shown in FIG. 13, had eight depleting spacers 650 and nine concentrating spacers 655, stacked in an alternating fashion, with heterogeneous ion-selective membranes 660 disposed between the spacers. The stack of spacers and ion-selective membranes were bounded by electrodes 665 housed in endblocks 670. Threaded rods 675 and nuts 680 were used to compress the stack and endblock assembly, to compress the seals and to counter internal hydrostatic pressure during operation.

Figure 14:
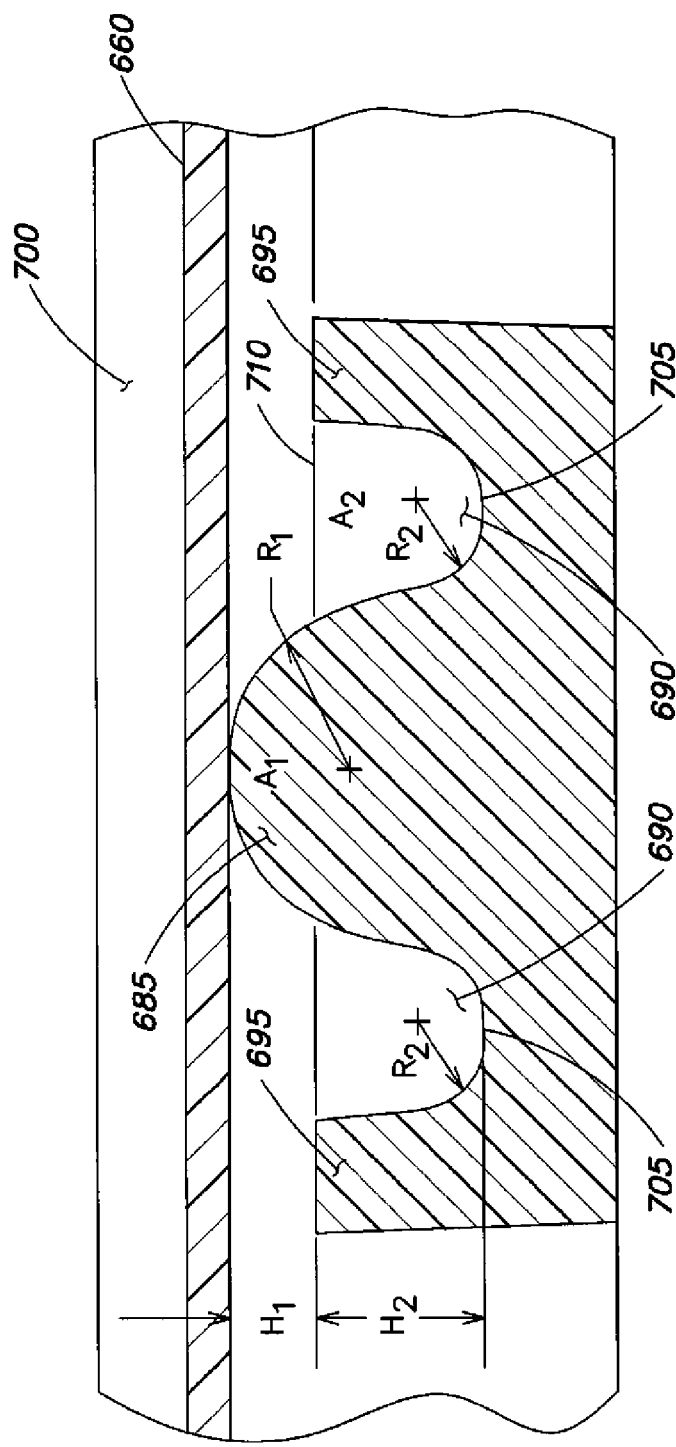
FIG. 14 is a cross-sectional view of a seal utilized in the spacer illustrated in FIG. 12 according to one or more embodiments of the present invention.

FIG. 14 is a cross-sectional view of a portion of resin cavity seal and a portion of resin cavity 585 of the depleting compartment spacer 550. The resin cavity seal 580 had a profile having a middle protruded region 685 between recessed regions 690. Seal 580 also had level regions 695 at the periphery of the seal. The seal profile was created by providing a mold assembly having corresponding features complementarily defining the protruded regions and recessed regions. FIG. 14 shows a portion of the seal disposed in the electrodeionization apparatus before the electrodionization apparatus assembly was tightened. In particular, it shows the ion-selective membrane 660 against the protruded region 685 of the seal and between the rigid core 700 of the adjacent concentrating compartment. In this embodiment, the protruded region 685 had a diameter of about 0.060 inch. A curved portion 705 of the recessed region 690 had a diameter of about 0.030 inch. The separation distance defining between the wall of the protruded region 685 and the level region 695 was about 0.018 inch. Once the assembly is tightened, the protruded region 685 would compress and deform to conform with the shape of the membrane 660 and the rigid core 700. In particular, the elastomeric material comprising the seal would deform under compressive loading into the space defined by the recessed regions 690. The particular ratios and dimensions of each of the seal sections were selected to provide a 30% crush capability. The seals were fabricated to provide:

$R_2 \gtreqqless \frac{1}{2} R_1$,
$H_1 \sim \frac{1}{2} H_2$, and
$A_2 \gtreqqless A_1$, wherein $H_1$ is the greatest dimension of protruded region 685 from a datum 710 defined by level region 695, $H_2$ is the greatest dimension of recessed region 690 from datum 710, Al is the cross-sectional area included in the protruded region 685 and datum 710, $A_2$ is the cross-sectional open area included in the recessed region 690 and datum 710, $R_1$ is the radius of protruded region 685, and $R_2$ is the radius of recessed region 690. Likewise, seals 570 and 605 had similar profiles.

The depleting compartments were filled with layers of cation and anion exchange resins, DOWEX™ MONOSPHERE™ 650C cation resin, available from The Dow Chemical Company, Midland, Mich. and a mixture of DOWEX™ MARATHON™ A anion resin, available from The Dow Chemical Company, Midland, Mich., and AMBERJET® 4600 anion resin, available from Rohm and Haas Company, Philadelphia, Pa. The concentrating compartments were filled with a mixture of cation and anion resins, DOWEX™ MONOSPHERE™ 650C cation resin, DOWEX™ MARATHON™ A anion resin, and AMBERJET® 4600 anion resin.

Water to be purified entered the depleting compartment through inlet port 610 and flows through the spacer in a U-shaped path defined by conduit 625, resin cavity 585, conduit 630, resin cavity 590, conduit 635 and out of the spacer through outlet port 615.

The completed electrodeionization apparatus, shown in FIG. 13, was pressurized with water to over 50 psi without any external leaks, confirming the effectiveness of the peripheral seals 570. Cross-leakage between the diluting and concentrating compartments was measured at 5 psi differential confirming that there was no leakage and that the seals around the throughports 620 in FIG. 12 effectively fluidly isolated the various structures.

The electrodeionization apparatus was operated under the following conditions:

| | |
|---|---|
| Feed water flow rate: | 110 liter/min |
| Feed water conductivity: | 10 µS/cm |
| Feed water $CO_2$ concentration: | 2.5 ppm |
| Feed water temperature: | 10° C. |
| Voltage applied: | 130 VDC |
| Current: | 0.3 amp |
| Water recovery: | 90% |

The water recovery is the fraction of the feed water that was purified; the flow rate of the purified product was therefore 100 liter/min.

The product, purified water, conductivity was measured as 0.059 µS/cm, indicating removal of greater than 99.4% of the dissolved ions in the feed water. The pressure drop through the electrodeionization apparatus was measured as 10 psi.

EXAMPLE 5

Disposable and Sealed Fuel Cell

In this example, a disposable and/or sealed fuel cell can be fabricated according to the present invention. Fuel cells, including those based on proton exchange membrane (PEM) technology, can be used, for example, to power portable electrical equipment and electronic devices such as laptop computers and cell phones. Fuels cells can be used in a portable applications especially where the volumetric power density increases and the cost decreases through advancement in the design, performance and properties of components such as the membrane, the electrodes, and the flow field plates. Examples of fuel cell apparatus, including those based on proton exchange membrane fuel cell (PEMFC) technology, are available from Plug Power Inc., Latham, N.Y., and Ballard Power Systems Inc., Burnaby, BC, Canada.

Figure 15:
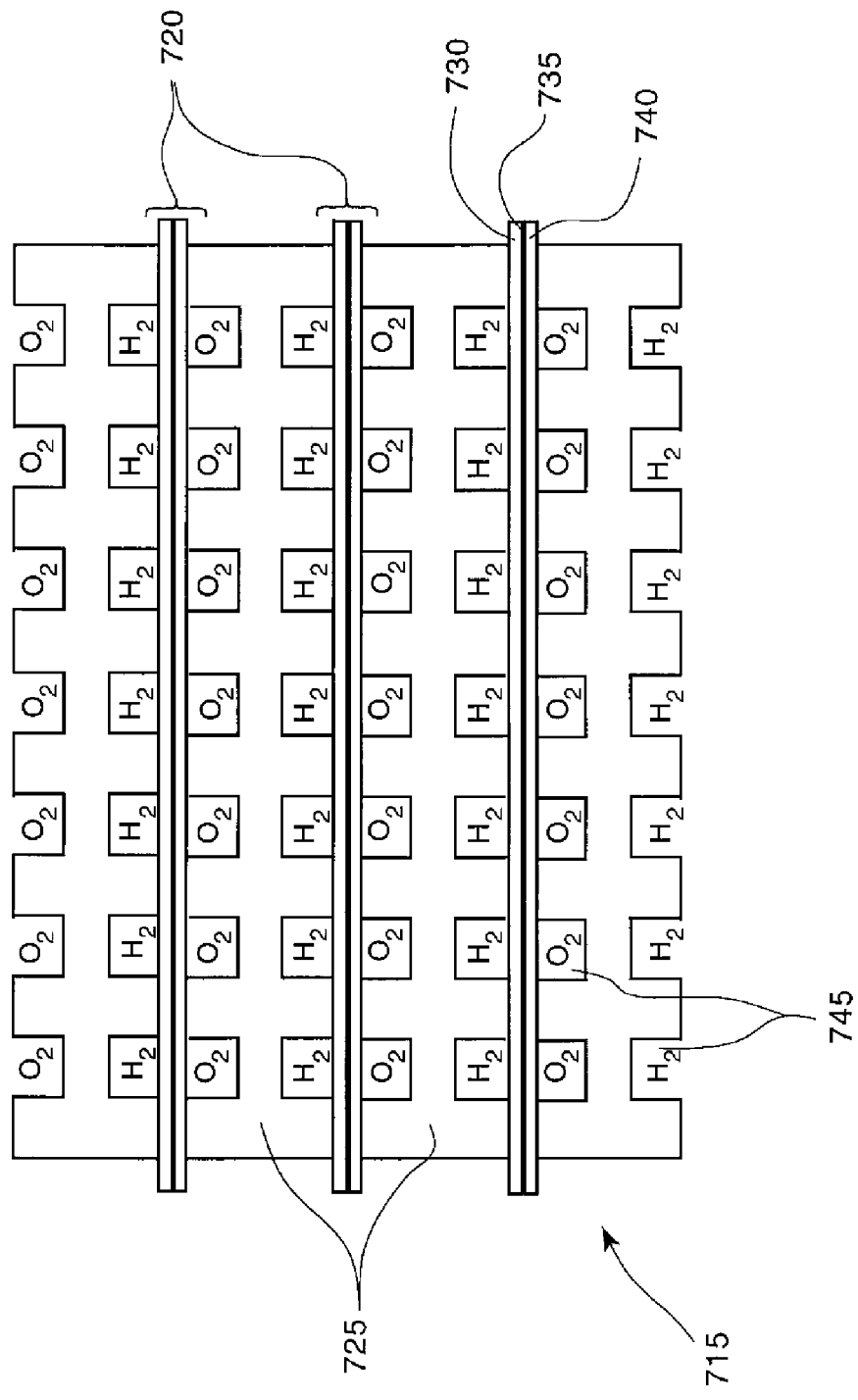
FIG. 15 is a schematic view of a portion of a fuel cell.

FIG. 15 is a cross-sectional view of a portion 715 of a typical PEMFC. The fuel cell typically has planar membrane-electrode assemblies (MEA) 720 secured between flow field plates 725. Each MEA 720 typically comprises a construction comprising an anode 730, a PEM 735 and a cathode 740. Grooves 745 defined in the flow field plates 725 typically serve as conduits to facilitate transport of reactant gases, typically hydrogen and oxygen, to the MEA 720 during operation of the fuel cell. The plates 725, which are typically fabricated from graphite or graphite composites, can also serve to collect the current generated at MEA 720.

Figure 16:
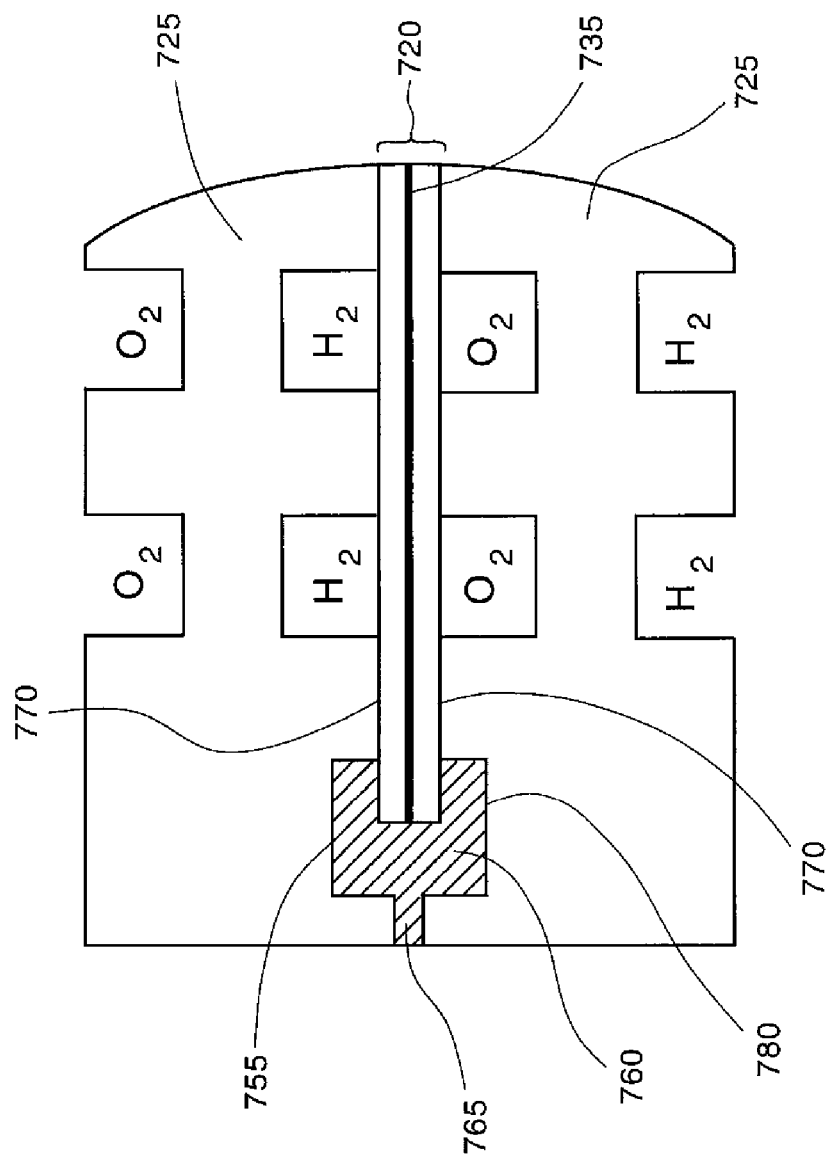
FIG. 16 is an enlarged schematic view of the portion of the fuel cell shown in FIG. 15.

One of the challenges of fuel cell construction is a seal around a perimeter of the MEA 720. The PEM 735 may serve as a gasket between adjacent plates. FIG. 16 is an enlarged view of a portion of a sealed PEMFC shown in FIG. 15. FIG. 16 shows MEA 720 disposed between two adjacent plates 725, contacting at interfaces 770. An aperture 765 defined between plates 725 and outside of interfaces 770 ensures that the plates 725 are not in electrical contact. The fuel cell typically has multiply stacked alternating plates 725 and MEA 720.

In one embodiment of the invention related to the fabrication of a seal fuel cell stack, the fuel cell stack is disposed in a mold (not shown) and molten TPE material is injected into a channel 750 defined, at least partially, by the grooves 755 in plates 725. Upon cooling, the injected TPE material 760 fills the spaced defined by channel 755 as well as aperture 765 and forms a seal 780 around MEA 720. The TPE material 760 is typically selected to be electrically insulating, compatible with the operating temperature, and chemically compatible with the reactant gases. For example, the TPE material can be any of those described above. Adhesion between the TPE material and the plates is desirable to minimize the clamping force necessary to maintain compression on the seals.

This method of sealing the perimeter of a MEA may be applicable to other designs of PEMFC including, for example, the fuel cells with non-planar MEA. The method of the present invention can also be applicable to sealing membranes in other types of electrochemical devices, such as electrolytic cells and electrical purification devices based on, for example, electrodialysis and electrodeionization technology.

This invention is not limited in its application to the details of construction and the arrangement of components set forth herein or illustrated in the drawings. The invention is capable of other embodiments and of being practiced or of being carried out in various ways. Also, the phraseology and terminology used herein is for the purpose of description and should not be regarded as limiting. The use of "including," "comprising," "having," "containing", "involving," and variations thereof herein, is meant to encompass the items listed thereafter and equivalents thereof as well as additional items.

As used herein, the phrase "mechanically bonded" refers to structural elements that create or have interlocking features creating interferences that prevent movement of the secured or bonded elements and the phrase "chemically bonded" refers to an interlocking or interpenetrating network or assembly of chemical, typically molecular, species that involves chemical bonds having a covalent and/or ionic nature. The phrase "thermally bonded" refers to a fabrication technique useful in fabricating articles comprised of a plurality of components by contacting molten material to raise the temperature of another, or the same, material and melting such meltable material, preferably locally, and cooling the assembly such that the solidified molten materials become secured, e.g., bonded, to each other. The term "binding" broadly refers to securing a component or segment to another component or segment to form an assembly. It includes mechanical bonding, chemical bonding and thermal bonding techniques as well as other techniques that fasten one or more components or segments together such as but not limited to the use of welds, adhesives, cements, and other bonding agents.

Also as used herein, the term "rigid" describes a material that is inflexible at ambient temperature and/or at temperatures during fabrication or assembly of components of articles of the invention and the term "flexible" describes a material that is pliant and at least partially yields and deform in response to an applied force. The term "elastomeric" refers to a material that responds to an applied tensile or compressive force and generally readily returns to its original shape upon release of the applied force. In some embodiments of the present invention, the term "elastomeric" refers to a material that comprises a thermosetting polymer, a thermoplastic polymer, or a combination or blend thereof. Further, the phrase "thermoplastic elastomer" refers to a class of materials having a rubber component. Such materials include those commercially available materials typically referred to as TPE, thermoplastic rubber (TPR), thermoplastic urethane (TPU), thermoplastic elastomeric olefin (TEO), and thermoplastic vulcanizate (TPV).

Also as used herein, the term "conduit" refers to a passageway that provides communication, typically fluid communication, between structures. For example, the conduit can perform as a manifold fluidly connecting a first structure to one or more structures, providing one or more flowpaths between the structures.

Also as used herein, the phrase "ion exchange resin" refers to electrically active or electroactive media. The phrase "resin cavity" refers to a structure designed and constructed to contain, at least partially, electroactive media. Also as used herein, the phrase "ion-selective membrane" refers to any selectively permeable membrane such as cation or anion selective permeable membranes and which are also referred to as selectively permeable membranes, ion exchange membrane, semi-permeable ion exchange membranes, and bipolar membranes.

Having thus described several aspects of at least one embodiment of this invention, it is to be appreciated that various alterations, modifications, and improvements will readily occur to those skilled in the art. For example, the techniques of injection bonding and over-molding in accordance with the present invention can be used to fabricate articles such as a garden water spray nozzle having rigid segments secured with a TPE network which also forms a sheathing that serves as a handgrip, a valve comprising mated rigid segments secured together with an elastomeric material which also forms a gasket or seal at the interconnection to a hose. Further, other consumer products, such as water-sealed toys, can be fabricated in accordance with the present invention. Notably, the present invention can be used to fabricate components of other apparatus based on the plate and frame design. For example, the invention can be used to fabricate plates, of a plate-and-frame heat exchanger, to have an elastomeric network securing rigid components and a seal encapsulating a portion of the surface of the plate. Such alterations, modifications, and improvements are intended to be part of this disclosure, and are intended to be within the spirit and scope of the invention. Moreover, the techniques used in accordance with the present invention include those known in the art. For example, with reference to molding techniques, those skilled in the art can design and fabricate molds or mold segments that allows for optimized flow of elastomeric material during the fabrication process. In particular, one skilled in the art of mold design can utilize tools such as computers to simulate and characterize the flow during fabrication. Further, non-elastomeric materials can be utilized in the articles and methods of the present invention. For example, a reactive non-elastomeric material can be utilized to form the network securing or boding rigid segments and further forming a sheathing on a surface of the rigid segments. Accordingly, the foregoing description and drawings are by way of example only.

The invention claimed is:

1. An electrodeionization apparatus spacer comprising a rigid core and an elastomeric material network, wherein a portion of the elastomeric material network is disposed in a channel inside the rigid core and a portion of the elastomeric material network defines a seal on at least a portion of a surface of the rigid core.

2. The electrodeionization apparatus spacer of claim 1, further comprising a resin cavity in fluid communication with an inlet port and with an outlet port, wherein the inlet port, the outlet port and the resin cavity are defined in the rigid core.

3. The electrodeionization apparatus spacer of claim 2, further comprising an inlet port seal comprised of the elastomeric material and disposed at a periphery of the inlet port.

4. The electrodeionization apparatus spacer of claim 3, further comprising an outlet port seal comprised of the elastomeric material and disposed at a periphery of the outlet port.

5. The electrodeionization apparatus spacer of claim 4, further comprising a resin cavity seal comprised of the elastomeric material and disposed at a periphery of the resin cavity.

6. The electrodeionization apparatus spacer of claim 5, further comprising an outer seal comprised of the elastomeric material and disposed at a periphery of the rigid core.

7. The electrodeionization apparatus spacer of claim 6, wherein the rigid core is comprised of a thermoplastic polymer and the elastomeric material is comprised of the thermoplastic polymer.

8. The electrodeionization apparatus spacer of claim 7, further comprising an internal inlet seal comprised of the elastomeric material and disposed within the rigid core and at a periphery of an inlet manifold that fluidly connects the inlet port to the resin cavity.

9. The electrodeionization apparatus spacer of claim 8, further comprising an internal outlet seal comprised of the elastomeric material and disposed within the rigid core and at a periphery of an outlet manifold that fluidly connects the resin cavity to the outlet port.

10. The electrodeionization apparatus spacer of claim 9, further comprising a through port defined in the rigid core and a through port seal fluidly isolating the through port from the inlet port, the outlet port, and the resin cavity.

11. An electrodeionization apparatus spacer comprising a rigid core comprising complementary mating first and second sections secured together with an unitary elastomeric material.

12. The electrodeionization apparatus spacer of claim 11, further comprising a seal comprised of the elastomeric material and disposed on a surface of the rigid core.

13. An electrodeionization apparatus spacer comprising a rigid core and a unitary elastomeric material, wherein a portion of the elastomeric material forms a seal disposed within the rigid core and wherein a portion of the elastomeric material encapsulates at least a portion of an outer surface of the rigid core.

14. The electrodeionization apparatus spacer of claim 13, further comprising a resin cavity defined in the rigid core, the resin cavity in communication with an inlet port and an outlet port, wherein the inlet port and the outlet port are defined in the rigid core.

15. The electrodeionization apparatus spacer of claim 14, further comprising an external inlet port seal disposed at a periphery of the inlet port and an external outlet port seal disposed at a periphery of the outlet port, wherein the external inlet port seal and the external outlet port seal are comprised of the elastomeric material.

16. The electrodeionization apparatus spacer of claim 14, further comprising an internal inlet seal comprised of the elastomeric material and disposed within the rigid core.

17. The electrodeionization apparatus spacer of claim 14, further comprising an internal outlet seal comprised of the elastomeric material and disposed within the rigid core.

18. An electrodeionization apparatus spacer comprising: a rigid core comprising an inlet port connected to a resin cavity through an inlet conduit and an outlet port connected to the resin cavity through an outlet conduit; and a unitary resilient material forming an inlet port seal around the inlet port, a resin cavity seal around the resin cavity, an outlet port seal around the outlet port, an inlet conduit seal around the inlet conduit, and an outlet conduit seal around the outlet conduit, and an outer seal disposed around a periphery of the rigid core, wherein the rigid core and the unitary resilient material is comprised of a thermoplastic polymer.

19. An electrodeionization apparatus comprising:
  a concentrating compartment defined by a concentrating compartment spacer; and
  a depleting compartment disposed adjacent the concentrating compartment and defined by a depleting compartment spacer comprising a rigid core and an elastomeric material network comprising an elastomeric material,
  wherein a portion of the elastomeric material network is disposed inside the rigid core and wherein the depleting compartment spacer further comprises a seal, peripherally disposed around the rigid core, comprised of the elastomeric material.

20. The electrodeionization apparatus of claim 19, wherein the depleting compartment spacer further comprises an inlet port defined in the rigid core and an inlet port seal comprised of the elastomeric material and peripherally disposed around the inlet port.

21. The electrodeionization apparatus of claim 19, wherein the depleting compartment spacer further comprises an outlet port defined in the rigid core and an outlet port seal comprised of the elastomeric material and peripherally disposed around the outlet port.

22. The electrodeionization apparatus of claim 19, wherein the depleting compartment spacer further comprises a resin cavity defined in the rigid core and a resin cavity seal comprised of the elastomeric material and peripherally disposed around the resin cavity.

* * * * *